(12) United States Patent
Vespe et al.

(10) Patent No.: US 8,347,202 B1
(45) Date of Patent: Jan. 1, 2013

(54) DETERMINING GEOGRAPHIC LOCATIONS FOR PLACE NAMES IN A FACT REPOSITORY

(75) Inventors: David Vespe, New York, NY (US); Andrew Hogue, Ho Ho Kus, NJ (US)

(73) Assignee: Google Inc., Mountain View, CA (US)

( * ) Notice: Subject to any disclaimer, the term of this patent is extended or adjusted under 35 U.S.C. 154(b) by 1129 days.

(21) Appl. No.: 11/686,217

(22) Filed: Mar. 14, 2007

(51) Int. Cl.
*G06F 17/00* (2006.01)

(52) U.S. Cl. ........ 715/200; 715/205; 715/206; 715/207; 715/208

(58) Field of Classification Search .......... 715/205–208, 715/211, 234, 760, 200
See application file for complete search history.

(56) References Cited

U.S. PATENT DOCUMENTS

| | | | |
|---|---|---|---|
| 5,010,478 A | 4/1991 | Deran | 364/200 |
| 5,133,075 A | 7/1992 | Risch | 395/800 |
| 5,347,653 A | 9/1994 | Flynn et al. | |
| 5,440,730 A | 8/1995 | Elmasri et al. | |
| 5,475,819 A | 12/1995 | Miller et al. | |
| 5,519,608 A | 5/1996 | Kupiec | 704/9 |
| 5,560,005 A | 9/1996 | Hoover et al. | |
| 5,574,898 A | 11/1996 | Leblang et al. | |
| 5,675,785 A | 10/1997 | Hall et al. | |
| 5,680,622 A | 10/1997 | Even | |
| 5,694,590 A | 12/1997 | Thuraisingham et al. | 395/600 |
| 5,701,470 A | 12/1997 | Joy et al. | |
| 5,717,911 A | 2/1998 | Madrid et al. | 395/602 |
| 5,717,951 A | 2/1998 | Yabumoto | 395/831 |
| 5,724,571 A | 3/1998 | Woods | |
| 5,778,373 A | 7/1998 | Levy et al. | 710/11 |
| 5,778,378 A | 7/1998 | Rubin | 707/103 R |
| 5,787,413 A | 7/1998 | Kauffman et al. | 707/2 |
| 5,793,966 A | 8/1998 | Amstein et al. | 395/200.33 |
| 5,802,299 A | 9/1998 | Logan et al. | 709/218 |
| 5,815,415 A | 9/1998 | Bentley et al. | |
| 5,819,210 A | 10/1998 | Maxwell, III et al. | 704/9 |
| 5,819,265 A | 10/1998 | Ravin et al. | |

(Continued)

FOREIGN PATENT DOCUMENTS

| | | |
|---|---|---|
| JP | 5-174020 | 7/1993 |

(Continued)

OTHER PUBLICATIONS

Gilster, P., 'Get Fast Answers, easily', http://www.newsobserver.com, Oct. 2005.*

(Continued)

*Primary Examiner* — Chau Nguyen

(74) *Attorney, Agent, or Firm* — Morgan, Lewis & Bockius LLP

(57) ABSTRACT

A system and method for tagging place names with geographic location coordinates, the place names associated with a collection of objects in a memory of a computer system. The system and method process a text string within an object stored in memory to identify a first potential place name. The system and method determine whether geographic location coordinates are known for the first potential place name. The system and method identify the first potential place name associated with an object in the memory as a place name. The system and method tag the first identified place name associated with an object in the memory with its geographic location coordinates, when the geographic location coordinates for the first identified place name are known. The system and method disambiguate place names when multiple place names are found.

19 Claims, 15 Drawing Sheets

U.S. PATENT DOCUMENTS

| | | | |
|---|---|---|---|
| 5,822,743 | A | 10/1998 | Gupta et al. |
| 5,826,258 | A | 10/1998 | Gupta et al. ............ 707/4 |
| 5,838,979 | A | 11/1998 | Hart et al. |
| 5,909,689 | A | 6/1999 | Van Ryzin |
| 5,920,859 | A | 7/1999 | Li .................... 707/5 |
| 5,943,670 | A | 8/1999 | Prager ................ 707/5 |
| 5,956,718 | A | 9/1999 | Prasad et al. .......... 707/10 |
| 5,974,254 | A | 10/1999 | Hsu |
| 5,987,460 | A | 11/1999 | Niwa et al. ............ 707/6 |
| 6,006,221 | A | 12/1999 | Liddy et al. ........... 707/5 |
| 6,018,741 | A | 1/2000 | Howland et al. |
| 6,038,560 | A | 3/2000 | Wical ................. 707/5 |
| 6,044,366 | A | 3/2000 | Graffe et al. .......... 707/2 |
| 6,052,693 | A | 4/2000 | Smith et al. ........... 707/104 |
| 6,064,952 | A | 5/2000 | Imanaka et al. ........ 704/9 |
| 6,073,130 | A | 6/2000 | Jacobson et al. ....... 707/5 |
| 6,078,918 | A | 6/2000 | Allen et al. |
| 6,112,203 | A | 8/2000 | Bharat et al. .......... 707/5 |
| 6,112,210 | A | 8/2000 | Nori et al. |
| 6,122,647 | A | 9/2000 | Horowitz et al. ....... 715/205 |
| 6,134,555 | A | 10/2000 | Chadha et al. ......... 707/102 |
| 6,138,270 | A | 10/2000 | Hsu |
| 6,182,063 | B1 | 1/2001 | Woods |
| 6,202,065 | B1* | 3/2001 | Wills ................. 1/1 |
| 6,212,526 | B1 | 4/2001 | Chaudhuri et al. ...... 707/102 |
| 6,240,546 | B1 | 5/2001 | Lee et al. ............ 717/4 |
| 6,263,328 | B1 | 7/2001 | Coden et al. .......... 707/3 |
| 6,285,999 | B1 | 9/2001 | Page ................. 707/5 |
| 6,289,338 | B1 | 9/2001 | Stoffel et al. ......... 707/3 |
| 6,311,194 | B1 | 10/2001 | Sheth et al. |
| 6,327,574 | B1 | 12/2001 | Kramer et al. ......... 705/14 |
| 6,349,275 | B1 | 2/2002 | Schumacher et al. ..... 704/8 |
| 6,377,943 | B1 | 4/2002 | Jakobsson ............ 707/2 |
| 6,397,228 | B1 | 5/2002 | Lamburt et al. |
| 6,438,543 | B1 | 8/2002 | Kazi et al. |
| 6,470,330 | B1 | 10/2002 | Das et al. |
| 6,473,898 | B1 | 10/2002 | Waugh et al. ......... 717/168 |
| 6,487,495 | B1* | 11/2002 | Gale et al. ........... 701/209 |
| 6,502,102 | B1 | 12/2002 | Haswell et al. ........ 707/102 |
| 6,519,631 | B1 | 2/2003 | Rosenschein et al. .... 709/217 |
| 6,556,991 | B1 | 4/2003 | Borkovsky |
| 6,565,610 | B1* | 5/2003 | Wang et al. .......... 715/210 |
| 6,567,846 | B1 | 5/2003 | Garg et al. ........... 709/218 |
| 6,567,936 | B1 | 5/2003 | Yang et al. ........... 714/37 |
| 6,572,661 | B1 | 6/2003 | Stern ................ 715/203 |
| 6,578,032 | B1 | 6/2003 | Chandrasekar et al. |
| 6,584,464 | B1 | 6/2003 | Warthen ............. 707/4 |
| 6,594,658 | B2 | 7/2003 | Woods |
| 6,606,625 | B1 | 8/2003 | Muslea et al. ......... 707/6 |
| 6,606,659 | B1 | 8/2003 | Hegli et al. .......... 709/225 |
| 6,609,123 | B1 | 8/2003 | Cazemier et al. ....... 707/4 |
| 6,636,742 | B1* | 10/2003 | Torkki et al. ......... 455/456.1 |
| 6,643,641 | B1 | 11/2003 | Snyder .............. 707/4 |
| 6,665,659 | B1 | 12/2003 | Logan ............... 707/3 |
| 6,665,666 | B1 | 12/2003 | Brown et al. ......... 707/5 |
| 6,665,837 | B1 | 12/2003 | Dean et al. .......... 715/234 |
| 6,675,159 | B1 | 1/2004 | Lin et al. |
| 6,684,205 | B1 | 1/2004 | Modha et al. |
| 6,693,651 | B2 | 2/2004 | Biebesheimer et al. ... 345/837 |
| 6,704,726 | B1 | 3/2004 | Amouroux ........... 707/4 |
| 6,738,767 | B1 | 5/2004 | Chung et al. ......... 707/7 |
| 6,745,189 | B2 | 6/2004 | Schreiber |
| 6,754,873 | B1 | 6/2004 | Law et al. ........... 715/208 |
| 6,763,496 | B1 | 7/2004 | Hennings et al. |
| 6,799,176 | B1 | 9/2004 | Page ................ 707/5 |
| 6,804,667 | B1 | 10/2004 | Martin ............... 707/6 |
| 6,820,081 | B1 | 11/2004 | Kawai et al. |
| 6,820,093 | B2 | 11/2004 | de la Huerga |
| 6,823,495 | B1 | 11/2004 | Vedula et al. ........ 715/805 |
| 6,832,218 | B1 | 12/2004 | Emens et al. ......... 707/3 |
| 6,845,354 | B1 | 1/2005 | Kuo et al. ........... 704/9 |
| 6,850,896 | B1 | 2/2005 | Kelman et al. ........ 705/10 |
| 6,873,982 | B1 | 3/2005 | Bates et al. .......... 707/5 |
| 6,873,993 | B2 | 3/2005 | Charlesworth et al. |
| 6,886,005 | B2 | 4/2005 | Davis ............... 707/2 |
| 6,886,010 | B2 | 4/2005 | Kostoff .............. 707/3 |
| 6,901,403 | B1 | 5/2005 | Bata et al. .......... 707/101 |
| 6,904,429 | B2 | 6/2005 | Sako et al. .......... 707/3 |
| 6,957,213 | B1 | 10/2005 | Yuret ............... 707/4 |
| 6,963,880 | B1 | 11/2005 | Pingte et al. ........ 707/103 |
| 6,965,900 | B2 | 11/2005 | Srinivasa et al. ..... 707/102 |
| 7,003,506 | B1 | 2/2006 | Fisk et al. .......... 707/1 |
| 7,003,522 | B1 | 2/2006 | Reynar et al. ....... 707/10 |
| 7,003,719 | B2 | 2/2006 | Rosenoff et al. ..... 715/205 |
| 7,007,228 | B1* | 2/2006 | Carro .............. 715/210 |
| 7,013,308 | B1 | 3/2006 | Tunstall-Pedoe ...... 707/104.1 |
| 7,020,662 | B2 | 3/2006 | Boreham et al. ..... 707/104.1 |
| 7,043,521 | B2 | 5/2006 | Eitel ............... 709/202 |
| 7,051,023 | B2 | 5/2006 | Kapur et al. ....... 707/5 |
| 7,076,491 | B2 | 7/2006 | Tsao ............... 707/100 |
| 7,080,073 | B1 | 7/2006 | Jiang et al. ........ 707/7 |
| 7,080,085 | B1 | 7/2006 | Choy et al. ........ 707/101 |
| 7,100,082 | B2 | 8/2006 | Little et al. |
| 7,143,099 | B2 | 11/2006 | Lecheler-Moore et al. .. 707/101 |
| 7,146,536 | B2 | 12/2006 | Bingham et al. ..... 714/26 |
| 7,158,980 | B2 | 1/2007 | Shen ............... 707/100 |
| 7,162,499 | B2 | 1/2007 | Lees et al. ........ 707/203 |
| 7,165,024 | B2 | 1/2007 | Glover et al. ....... 704/9 |
| 7,174,504 | B2 | 2/2007 | Tsao ............... 715/503 |
| 7,181,471 | B1 | 2/2007 | Ibuki et al. ........ 707/201 |
| 7,194,380 | B2 | 3/2007 | Barrow et al. ...... 702/181 |
| 7,197,449 | B2 | 3/2007 | Hu et al. |
| 7,216,073 | B2 | 5/2007 | Lavi et al. ........ 704/9 |
| 7,233,943 | B2 | 6/2007 | Modha et al. |
| 7,277,879 | B2 | 10/2007 | Varadarajan ....... 707/1 |
| 7,302,646 | B2 | 11/2007 | Nomiyama et al. ... 715/764 |
| 7,305,380 | B1 | 12/2007 | Hoelzle et al. ..... 707/3 |
| 7,325,160 | B2 | 1/2008 | Tsao ............... 714/15 |
| 7,363,312 | B2 | 4/2008 | Goldsack ........... 707/102 |
| 7,376,895 | B2 | 5/2008 | Tsao ............... 715/517 |
| 7,409,381 | B1 | 8/2008 | Steel et al. ........ 707/3 |
| 7,412,078 | B2 | 8/2008 | Kim |
| 7,472,182 | B1 | 12/2008 | Young et al. |
| 7,483,829 | B2 | 1/2009 | Murakami et al. |
| 7,493,308 | B1 | 2/2009 | Bair, Jr. et al. ..... 707/3 |
| 7,493,317 | B2 | 2/2009 | Geva .............. 707/3 |
| 7,587,387 | B2 | 9/2009 | Hogue ............. 707/3 |
| 7,644,076 | B1 | 1/2010 | Ramesh et al. |
| 7,672,971 | B2 | 3/2010 | Betz et al. ........ 707/103 |
| 7,685,201 | B2 | 3/2010 | Zeng et al. |
| 7,698,303 | B2 | 4/2010 | Goodwin et al. |
| 7,716,225 | B1 | 5/2010 | Dean et al. |
| 7,747,571 | B2 | 6/2010 | Boggs |
| 7,756,823 | B2 | 7/2010 | Young et al. |
| 7,797,282 | B1 | 9/2010 | Kirshenbaum et al. |
| 7,885,918 | B2 | 2/2011 | Statchuk |
| 7,917,154 | B2* | 3/2011 | Fortescue et al. .... 455/456.1 |
| 7,953,720 | B1 | 5/2011 | Rohde et al. |
| 8,065,290 | B2 | 11/2011 | Hogue |
| 8,108,501 | B2* | 1/2012 | Birnie et al. ...... 709/223 |
| 2001/0021935 | A1 | 9/2001 | Mills ............. 707/513 |
| 2002/0022956 | A1 | 2/2002 | Ukrainczyk et al. |
| 2002/0038307 | A1 | 3/2002 | Obradovic et al. ... 707/102 |
| 2002/0042707 | A1 | 4/2002 | Zhao et al. ....... 704/9 |
| 2002/0065845 | A1 | 5/2002 | Naito et al. ....... 707/500.1 |
| 2002/0073115 | A1 | 6/2002 | Davis ............. 707/500.1 |
| 2002/0083039 | A1 | 6/2002 | Ferrari et al. ..... 707/1 |
| 2002/0087567 | A1 | 7/2002 | Spiegler et al. .... 707/100 |
| 2002/0107861 | A1 | 8/2002 | Clendinning et al. .. 707/101 |
| 2002/0147738 | A1 | 10/2002 | Reader |
| 2002/0169770 | A1 | 11/2002 | Kim et al. ........ 707/5 |
| 2002/0174099 | A1 | 11/2002 | Raj et al. ........ 707/1 |
| 2002/0178448 | A1 | 11/2002 | Te Kiefte et al. ... 725/46 |
| 2002/0194172 | A1 | 12/2002 | Schreiber ......... 707/4 |
| 2003/0018652 | A1 | 1/2003 | Heckerman et al. ... 707/104.1 |
| 2003/0058706 | A1 | 3/2003 | Okamoto et al. ..... 365/200 |
| 2003/0069880 | A1 | 4/2003 | Harrison et al. ..... 707/3 |
| 2003/0078902 | A1 | 4/2003 | Leong et al. ....... 706/59 |
| 2003/0097357 | A1 | 5/2003 | Ferrari et al. ...... 707/3 |
| 2003/0120644 | A1 | 6/2003 | Shirota |
| 2003/0120675 | A1 | 6/2003 | Stauber et al. ..... 707/100 |
| 2003/0126102 | A1 | 7/2003 | Borthwick |
| 2003/0126152 | A1 | 7/2003 | Rajak ............. 707/101 |
| 2003/0149567 | A1 | 8/2003 | Schmitz et al. ..... 704/270 |
| 2003/0149699 | A1 | 8/2003 | Tsao .............. 707/100 |
| 2003/0154071 | A1 | 8/2003 | Shreve ............ 704/9 |
| 2003/0177110 | A1 | 9/2003 | Okamoto et al. .... 707/3 |

| | | |
|---|---|---|
| 2003/0182310 A1 | 9/2003 | Charnock et al. ........... 707/104.1 |
| 2003/0195872 A1 | 10/2003 | Senn ................................. 707/3 |
| 2003/0195877 A1 | 10/2003 | Ford et al. .......................... 707/3 |
| 2003/0196052 A1 | 10/2003 | Bolik et al. |
| 2003/0208354 A1 | 11/2003 | Lin et al. |
| 2004/0003067 A1 | 1/2004 | Ferrin ........................... 709/223 |
| 2004/0015481 A1 | 1/2004 | Zinda |
| 2004/0024739 A1 | 2/2004 | Copperman et al. ............... 707/1 |
| 2004/0049503 A1 | 3/2004 | Modha et al. |
| 2004/0059726 A1 | 3/2004 | Hunter et al. ...................... 707/3 |
| 2004/0064447 A1 | 4/2004 | Simske et al. |
| 2004/0088292 A1 | 5/2004 | Dettinger et al. ................. 707/4 |
| 2004/0107125 A1 | 6/2004 | Guheen et al. ..................... 705/7 |
| 2004/0122844 A1 | 6/2004 | Malloy et al. .................. 707/102 |
| 2004/0122846 A1 | 6/2004 | Chess et al. .................... 707/102 |
| 2004/0123240 A1 | 6/2004 | Gerstl et al. .................... 715/513 |
| 2004/0128624 A1 | 7/2004 | Arellano et al. |
| 2004/0143600 A1 | 7/2004 | Musgrove et al. |
| 2004/0153456 A1 | 8/2004 | Charnock et al. ............... 707/10 |
| 2004/0167870 A1 | 8/2004 | Wakefield et al. ................ 707/1 |
| 2004/0177015 A1 | 9/2004 | Galai et al. ...................... 705/35 |
| 2004/0177080 A1 | 9/2004 | Doise et al. ................... 707/100 |
| 2004/0199923 A1 | 10/2004 | Russek .......................... 719/310 |
| 2004/0243552 A1 | 12/2004 | Titemore et al. .................. 707/3 |
| 2004/0243614 A1 | 12/2004 | Boone et al. |
| 2004/0255237 A1 | 12/2004 | Tong .............................. 715/232 |
| 2004/0260979 A1 | 12/2004 | Kumai |
| 2004/0267700 A1 | 12/2004 | Dumais et al. |
| 2004/0268237 A1* | 12/2004 | Jones et al. .................... 715/513 |
| 2005/0076012 A1 | 4/2005 | Manber et al. ..................... 707/3 |
| 2005/0080613 A1 | 4/2005 | Colledge et al. |
| 2005/0086211 A1 | 4/2005 | Mayer |
| 2005/0086222 A1 | 4/2005 | Wang et al. ....................... 707/5 |
| 2005/0086251 A1 | 4/2005 | Hatscher et al. |
| 2005/0097150 A1 | 5/2005 | McKeon et al. |
| 2005/0108630 A1 | 5/2005 | Wasson et al. ................ 715/513 |
| 2005/0125311 A1 | 6/2005 | Chidiac et al. .................. 705/28 |
| 2005/0149576 A1 | 7/2005 | Marmaros et al. ............ 707/200 |
| 2005/0149851 A1 | 7/2005 | Mittal |
| 2005/0187923 A1 | 8/2005 | Cipollone ......................... 707/3 |
| 2005/0240615 A1 | 10/2005 | Barsness et al. ............. 707/102 |
| 2005/0256825 A1 | 11/2005 | Dettinger et al. ................. 707/1 |
| 2006/0036504 A1 | 2/2006 | Allocca et al. .................. 705/26 |
| 2006/0041597 A1 | 2/2006 | Conrad et al. |
| 2006/0047838 A1 | 3/2006 | Chauhan ....................... 709/230 |
| 2006/0053171 A1 | 3/2006 | Eldridge et al. |
| 2006/0053175 A1 | 3/2006 | Gardner et al. |
| 2006/0064411 A1 | 3/2006 | Gross et al. ....................... 707/3 |
| 2006/0074824 A1 | 4/2006 | Li ................................... 706/20 |
| 2006/0074910 A1 | 4/2006 | Yun et al. .......................... 707/7 |
| 2006/0085465 A1 | 4/2006 | Nori et al. ..................... 707/101 |
| 2006/0112110 A1 | 5/2006 | Maymir-Ducharme et al. ............................. 707/100 |
| 2006/0123046 A1 | 6/2006 | Doise et al. ................... 707/102 |
| 2006/0136585 A1 | 6/2006 | Mayfield et al. |
| 2006/0143227 A1 | 6/2006 | Helm et al. |
| 2006/0143603 A1 | 6/2006 | Kalthoff et al. |
| 2006/0152755 A1 | 7/2006 | Curtis et al. ................ 358/1.15 |
| 2006/0167991 A1 | 7/2006 | Heikes et al. |
| 2006/0224582 A1 | 10/2006 | Hogue ............................. 707/6 |
| 2006/0238919 A1 | 10/2006 | Bradley et al. |
| 2006/0242180 A1 | 10/2006 | Graf et al. ..................... 707/101 |
| 2006/0248045 A1 | 11/2006 | Toledano et al. |
| 2006/0248456 A1 | 11/2006 | Bender et al. ................. 715/531 |
| 2006/0253418 A1 | 11/2006 | Charnock et al. ................ 707/1 |
| 2006/0259462 A1 | 11/2006 | Timmons .......................... 707/3 |
| 2006/0277169 A1 | 12/2006 | Lunt et al. ......................... 707/3 |
| 2006/0288268 A1 | 12/2006 | Srinivasan et al. |
| 2006/0293879 A1 | 12/2006 | Zhao et al. ........................ 704/9 |
| 2007/0005593 A1 | 1/2007 | Self et al. .......................... 707/6 |
| 2007/0005639 A1 | 1/2007 | Gaussier et al. ............. 707/103 |
| 2007/0016890 A1 | 1/2007 | Brunner et al. ............... 717/107 |
| 2007/0038610 A1 | 2/2007 | Omoigui ........................... 707/3 |
| 2007/0043708 A1 | 2/2007 | Tunstall-Pedoe |
| 2007/0055656 A1 | 3/2007 | Tunstall-Pedoe ................ 707/3 |
| 2007/0073768 A1 | 3/2007 | Goradia ..................... 707/104.1 |
| 2007/0094246 A1 | 4/2007 | Dill et al. .......................... 707/4 |
| 2007/0100814 A1 | 5/2007 | Lee et al. |
| 2007/0130123 A1 | 6/2007 | Majumder ........................ 707/3 |
| 2007/0143282 A1 | 6/2007 | Betz et al. ......................... 707/5 |
| 2007/0143317 A1 | 6/2007 | Hogue et al. .................. 707/100 |
| 2007/0150800 A1 | 6/2007 | Betz et al. ..................... 715/206 |
| 2007/0198451 A1 | 8/2007 | Kehlenbeck et al. ........... 706/50 |
| 2007/0198480 A1 | 8/2007 | Hogue et al. ...................... 707/3 |
| 2007/0198481 A1 | 8/2007 | Hogue et al. ...................... 707/3 |
| 2007/0198503 A1 | 8/2007 | Hogue et al. ...................... 707/5 |
| 2007/0198577 A1 | 8/2007 | Betz et al. ..................... 707/103 |
| 2007/0198598 A1 | 8/2007 | Betz et al. ..................... 707/201 |
| 2007/0198600 A1 | 8/2007 | Betz .............................. 707/201 |
| 2007/0203867 A1 | 8/2007 | Hogue et al. .................... 706/48 |
| 2007/0208773 A1 | 9/2007 | Tsao .............................. 707/103 |
| 2007/0271268 A1 | 11/2007 | Fontoura et al. .................. 707/6 |
| 2008/0071739 A1 | 3/2008 | Kumar et al. |
| 2008/0104019 A1* | 5/2008 | Nath ................................. 707/3 |
| 2009/0006359 A1 | 1/2009 | Liao |
| 2009/0119255 A1* | 5/2009 | Frank et al. ....................... 707/3 |

FOREIGN PATENT DOCUMENTS

| | | |
|---|---|---|
| JP | 11-265400 | 9/1999 |
| JP | 2002-157276 | 5/2002 |
| JP | 2002-540506 | 11/2002 |
| JP | 2003-281173 | 3/2003 |
| WO | WO 01/27713 | 4/2001 |
| WO | WO 2004/114163 | 12/2004 |
| WO | WO 2006/104951 | 10/2006 |

OTHER PUBLICATIONS

Agichtein, E., et al., "Snowball Extracting Relations from Large Plain-Text Collections," Columbia Univ. Computer Science Dept. Technical Report CUCS-033-99, Dec. 1999, pp. 1-13.

Brill, E., et al., "An Analysis of the AskMSR Question-Answering System," Proceedings of the Conference of Empirical Methods in Natural Language Processing (EMNLP), Jul. 2002, pp. 257-264.

Brin, S., Extracting Patterns and Relations from the World Wide Web, 1999, 12 pages.

Brin, S., et al., "The Anatomy of a Large-Scale Hypertextual Web Search Engine," 7th Int'l World Wide Web Conference, Brisbane, Australia, Apr. 14-18, 1998, pp. 1-26.

Bunescu, R., et al., "Using Encyclopedia Knowledge for Named Entity Disambiguation," Department of Computer Sciences, University of Texas, retrieved from internet Dec. 28, 2006, 8 pages.

Chang, C., et al., "IEPAD: Information Extraction Based on Pattern Discovery," WWW 10 '01, ACM, May 1-5, 2001, pp. 681-688.

Chu-Carroll, J., et al., "A Multi-Strategy and Multi-Source Approach to Question Answering," 2006, 8 pages.

Craswell, N., et al., "Effective Site Finding using Link Anchor Information," SIGIR '01, Sep. 9-12, 2001, pp. 250-257.

Dean, J., et al., "MapReduce: Simplified Data Processing on Large Clusters," OSDI, 2004, pp. 1-13.

Dong, X., et al., "Reference Reconciliation in Complex Information Spaces," SIGACM-SIGMOD, 2005, 12 pages.

Downey, D., et al., "Learning Text Patterns for Web Information Extraction and Assessment," American Association for Artificial Intelligence, 2002, 6 pages.

Etzioni, O., et al., "Web-scale Information Extraction in KnowItAll (Preliminary Results)," WWW2004, ACM May 17-20, 2004, 11 pages.

Freitag, D., et al., "Boosted Wrapper Induction," American Association for Artificial Intelligence, 2000, 7 pages.

Gao, X., et al., "Learning Information Extraction Patterns from Tabular Web Pages Without Manual Labelling," Proceedings of IEEE/WIC Int'l Conf. on Web Intelligence (WI'03), Oct. 13-17, 2003, pp. 495-498.

Gray, R.M., "Entropy and Information Theory," Springer-Verlag, New York, NY, 1990, pp. 17-46.

Guha, R., "Object Co-Identification on the Semantic Web," WWW2004, ACM, May 17-22, 2004, 9 pages.

Guha, R., et al., "Disambiguating People in Search," World Wide Web Conference, May 17-22, 2004, 9 pages.

Haveliwala, T.H., "Topic-Sensitive PageRank," Proceeding of the 11th Int'l World Wide Web Conference, Honolulu, Hawaii, May 7-11, 2002, pp. 1-23.

Hogue, A. W., Tree Pattern Inference and Matching for Wrapper Induction on the World Wide Web, Master of Engineering in Electrical Engineering and Computer Science, Massachusetts Institute of Technology, Jun. 2004, pp. 3-106.

"Information Entropy," Wikipedia, the Free Encyclopedia, Retrieved on May 3, 2006, pp. 1-9.

"Information Theory," Wikipedia, the Free Encyclopedia,: Retrieved on May 3, 2006, pp. 1-12.

International Search Report and Written Opinion for International Application No. PCT/US2007/61156, mailed Feb. 11, 2008, 7 pages.

International Search Report and Written Opinion for International Application No. PCT/US2006/019807, mailed Dec. 18, 2006, 4 pages.

International Search Report and Written Opinion for International Application No. PCT/US2006/07639, mailed Sep. 13, 2006, 6 pages.

Jeh, G., et al., "Scaling Personalized Web Search," Proceedings of the 12th Int'l World Wide Web Conference, Budapest, Hungary, May 20-24, 2003, pp. 1-24.

Ji, H., et al., "Re-Ranking Algorithms for Name Tagging," Workshop on Computationally Hard Problems and Joint Inference in Speech and Language Processing, Jun. 2006, 8 pages.

Jones, R., et al., Bootstrapping for Text Learning Tasks, 1999, 12 pages.

Kolodner, J., "Indexing and Retrieval Strategies for Natural Language Fact Retrieval," ACM Trans. Database Syst. 8.3., Sep. 1983, 434-464.

Kosseim, L., et al., "Answer Formulation for Question-Answering," 11 pages, Oct. 1, 2007.

Liu, B. et al., "Mining Data Records in Web Pages," Conference 2000, ACM, 2000, pp. 1-10.

MacKay, D.J.C., "Information Theory, Inference and Learning Algorithms," Cambridge University Press, 2003, pp. 22-33, 138-140.

Mann, G. et al., "Unsupervised Personal Name Disambiguation," Proceedings of the Seventy Conference on Natural Language Learning at HLT-NAACL, 2003, 8 pages.

McCallum, A., et al., "Object Consolidation by Graph Partitioning with a Conditionally-Trained Distance Metric, " SIGKDD 03, ACM, Aug. 24-27, 2003, 6 pages.

Mihalcea, R., et al., PageRank on Semantic Networks, with Application to Word Sense Disambiguation, Proceedings of the 20th International Conference on Computational Linguistics, Aug. 23-27, 2004, 7 pages.

Mihalcea, R., et al., "TextRank: Bringing Order into Texts," Proceedings of the Conference on Empirical Methods in Natural Language Processing, Jul. 2004, 8 pages.

Page, L., et al., "The PageRank Citation Ranking: Bringing Order to the Web," Stanford Digital Libraries Working Paper, 1998, pp. 1-17.

Pawson, D., "Sorting and Grouping," www.dpawson.co.uk/xsl/sect2/N6280.html>, Feb. 7, 2004, pp. 1-19.

Prager, J. et al., "IBM's Piquant in TREC2003," 2003, 10 pages.

Prager, J., et al., "Question Answering Using Constraint Satisfaction: QA-by-Dossier-with-Constraints," 2004, 8 pages.

Ramakrishnan, G., et al., "Is Question Answering an Acquired Skill?" WWW2004, ACM May 17, 2004, pp. 111-120.

Richardson, M., et al., "Beyond Page Rank: Machine Learning for Static Ranking," International World Wide Web Conference Committee, May 23, 2006, 9 pages.

Richardson, M., et al., "The Intelligent Surfer: Probabilistic Combination of Link and Content Information in PageRank," Advances in Neural Information Processing Systems, vol. 14, MIT Press, Cambridge, MA, 2002, 8 pages.

Rioloff, E., et al., "Learning Dictionaries for Information Extraction by Multi-Level Bootstrapping," American Association for Artificial Intelligence, 1999, 6 pages.

Shannon, C.E., et al., "A Mathematical Theory of Communication," The Bell System Technical Journal, vol. 27, Jul. Oct. 1948, pp. 1-55.

Sun Microsystems, "Attribute Names," http://java.sun.com/products/jndi/tutorial/basics/directory/attrnames.html>, Feb. 17, 2004, pp. 1-2.

Wang, Y., et al., "C4-2: Combining Link and Contents in Clustering Web Search to Improve Information Interpretation," The University of Tokyo, 2002, pp. 1-9.

Cover, T.M., et al., "Elements of Information Theory," Wiley-InterScience, New York, NY, 1991, pp. 12-23.

Gao, X., "Learning Information Extraction Patterns from Tabular Web Pages without Manual Labelling," IEEE/WIC International Conference, Oct. 13, 2003, pp. 495-498.

Gigablast, Web/Directory, http://www.gigablast.com/?c=dmoz3, printed Aug. 24, 2010, 1 page.

Hsu, C. et al., "Finite-State Transducers for Semi-Structured Text Mining," IJCAI-99 Workshop on Text Mining: Foundations, Techniques and Aplications, 1999, 12 pages.

Iiyas, I. et al., "Rank-aware Query Optimization," SIGMOD 2004, Jun. 13-18, 2004, 12 pages.

International Search Report and Written Opinion for International Application No. PCT/US2006/010965, mailed Jul. 5, 2006, 11 pages.

Lin, J. et al., Question Answering from the Web Using Knowledge Annotation and Knowledge Mining Techniques, CIKM '03, Nov. 3-8, 2003, 8 pages.

Nyberg, E. et al., "The JAVELIN Question-Answering System at TREC 2003: A Multi-Strategy Approach with Dynamic Planning," TREC 2003, 9 pages.

Ogden, W. et al., "Improving Cross-Language Text Retrieval with Human Interactions," Proceedings of the 33rd Hawaii International Conference on System Sciences, IEEE 2000, 9 pages.

Plaisant, C. et al. "Interface and Data Architecture for Query Preview in Networked Information Systems," ACM Transaction on Information Systems, vol. 17, Issue 3, Jul. 1999, 28 pages.

Wirzenius, Lars, "C Preprocessor Trick for Implementing Similar Data Types," Jan. 17, 2000, p. 1-9.

Zhao, S. et al., "Corroborate and Learn Facts from the Web," KDD'07, Aug. 12-15, 2007, 9 pages.

Andritsos, Information—Theoretic Tools for Mining Database Structure from Large Data Sets, Jun. 13-18, 2007, 12 pgs.

Chen, A Scheme for Inference Problems Using Rough Sets and Entropy, Aug. 31-Sep. 3, 2005, 10 pgs.

Dean, Using Design Recovery Techniques to Transform Legacy Systems, 2001, 10 pgs.

Etzioni, Unsupervised Named-Entity Extraction from the Web; an Experimental Study, Feb. 28, 2005, 42 pgs.

Google, Office Action, CA 2,610,208, Sep. 21, 2011, 3 pgs.

Google, Office Action, EP 06784449.8, Mar. 26, 2012, 7 pgs.

Google, Office Action, JP 2008-504204, Oct. 12, 2011, 3 pgs.

Koeller, Approximate Matching of Textual Domain Attributes for Information Source Integration, Jun. 17, 2005, 10 pgs.

Kosala, Web Mining Research: A Survey, Jul. 2000, 14 pgs.

Merriam Webster Dictionary defines "normalize" as "to make conform to or reduce to a norm or standard", 1865, 2 pgs.

Merriam Webster Dictionary defines "value" as "a numerical quantity that is assigned or is determined by... ", 1300, 2 pgs.

Microsoft Computer Dictionary defines "normalize" as "adjust number within specific range", May 1, 2002, 4 pgs.

Microsoft Computer Dictionary defines "quantity" as a "number", May 1, 2002, 4 pgs.

Microsoft Computer Dictionary defines " value" as a "quantity", May 1, 2002, 4 pgs.

Nadeau, Unsupervised Name-Entity Recognition: Generating Gazetteers and Resolving Ambiguity, Aug. 1, 2006, 12 pgs.

* cited by examiner

Example Format of Facts in Repository (each fact is associated with an object ID)

Example Facts in Repository (each fact is associated with an object ID)

Example Object Reference Table

Example Format of Facts in Repository (each fact is associated with an object ID)

Example Objects

California:

CA, Cali., Calif., California, Golden State

New York:

NY, New York, Empire State

FIG. 6 (a)

California:

Latitude:

32°30'N to 42°N

Longitude:

114°8'W to 124°24'W

New York:

Latitude:

40°29'40"N to 45°0'42"N

Longitude:

DETERMINING GEOGRAPHIC LOCATIONS FOR PLACE NAMES IN A FACT REPOSITORY

TECHNICAL FIELD

The disclosed embodiments relate generally to analyzing place names extracted in a collection of documents. More particularly, the disclosed embodiments relate to analyzing place names that have been extracted from documents such as web pages.

BACKGROUND

Place names extracted from different sources have a variety of formats and may contain typographical errors, omissions, or unclear language. There may also be ambiguity as to whether a word represents a place name and whether different place names represent the same location. It is useful to have a way to identify the precise location of a place name.

SUMMARY

In accordance with one aspect of the invention, a computer-implemented method and computer program product process a text string within an object stored in memory to identify a first potential place name. The method and computer program product determine whether geographic location coordinates are known for the first potential place name. Further, the method and computer program product identify the first potential place name as a place name and tag the identified place name associated with an object in the memory with its geographic location coordinates, when the geographic location coordinates for the first identified place name are known.

In one embodiment of the invention, a system includes a potential place name identifier to determine if a text string contains a first potential place name. The system also includes a coordinate determiner to determine whether geographic location coordinates are known for the first potential place name. In addition, the system includes a place name identifier to determine whether the first potential place name is a place name and a coordinate assignor to tag the first identified place name associated with an object in the memory with its geographic location coordinates, when the geographic location coordinates for the first identified place name are known.

BRIEF DESCRIPTION OF THE DRAWINGS

FIG. 6(a) is an example illustrating a method for determining whether a text string corresponds to a potential place name, according to one embodiment of the present invention.

FIG. 6(b) is an example illustrating a method for determining whether there are geographic location coordinates known for a potential place name, according to one embodiment of the present invention.

DESCRIPTION OF EMBODIMENTS

Embodiments of the present invention are now described with reference to the figures where like reference numbers indicate identical or functionally similar elements.

Figure 1:
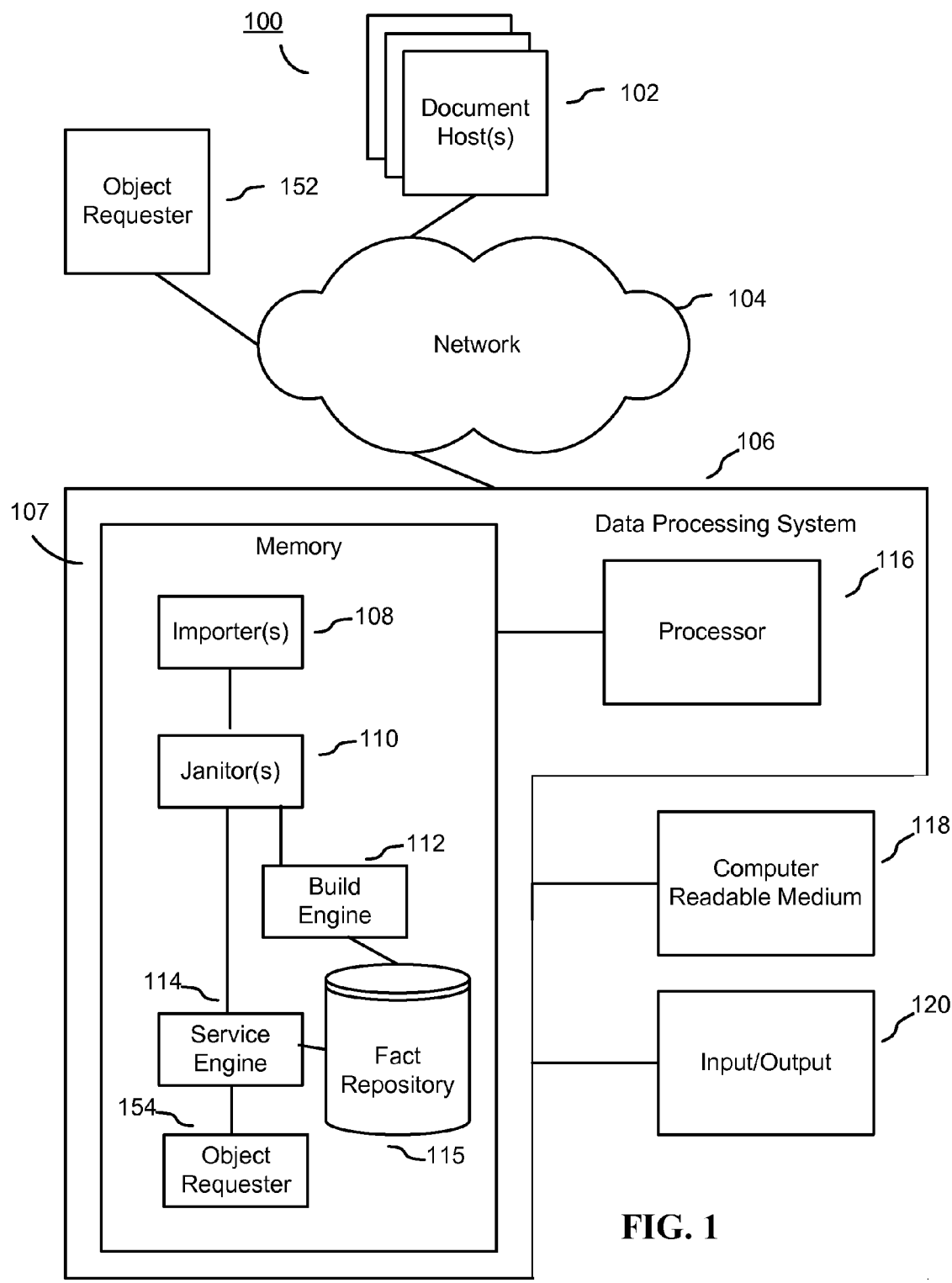
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any text string of document hosts 102 communicate with a data processing system 106, along with any text string of object requesters 152, 154.

Document hosts 102 store documents and provide access to documents. A document is comprised of any machine-readable data including any combination of text, graphics, multimedia content, etc. One example of a document is a book (e.g., fiction or nonfiction) in machine-readable form. A document may be encoded in a markup language, such as Hypertext Markup Language (HTML), e.g., a web page, in an interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any text string of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any text string of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Figure 2A:
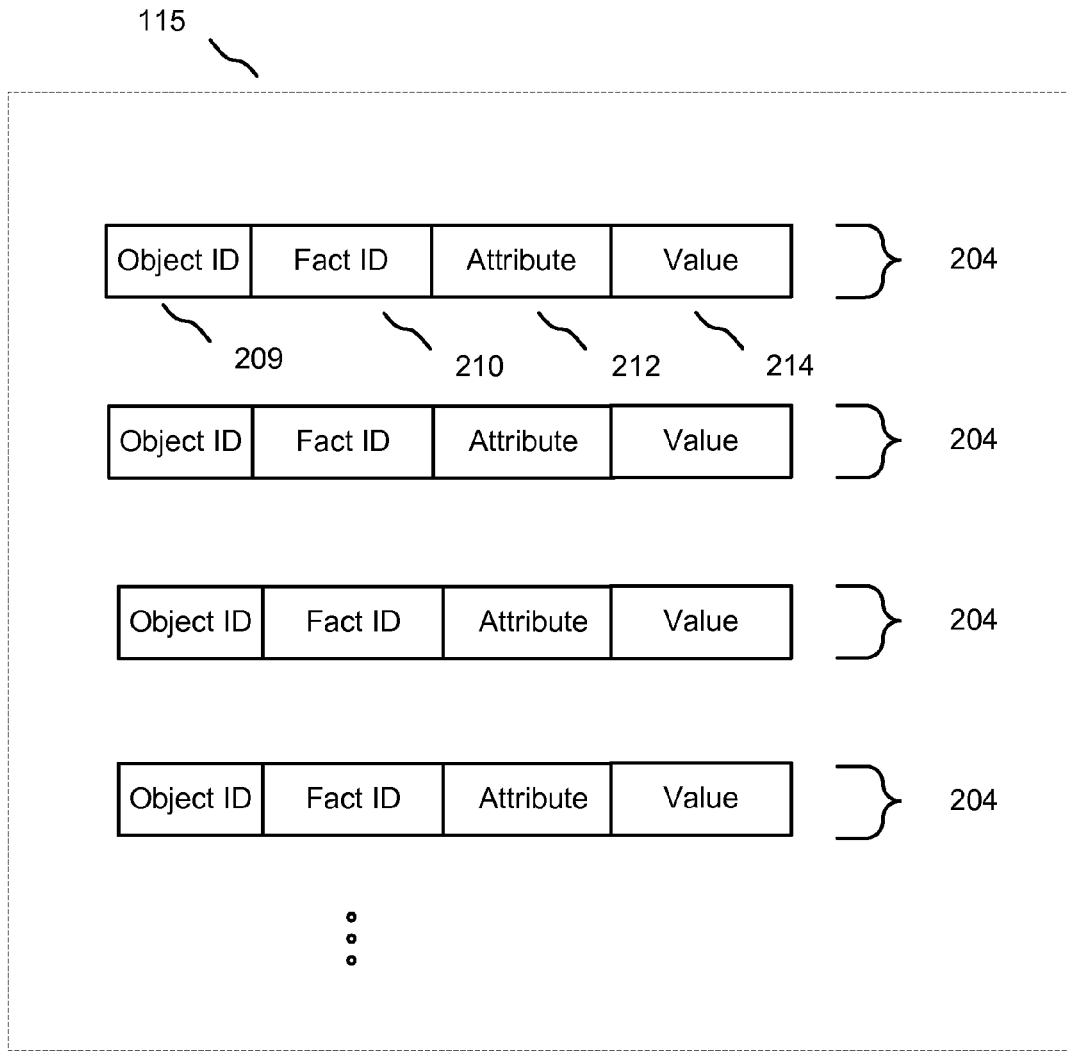
FIGS. 2(a)-2(d) are block diagrams illustrating a data structure for facts within a repository of FIG. 1 in accordance with preferred embodiments of the present invention.

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
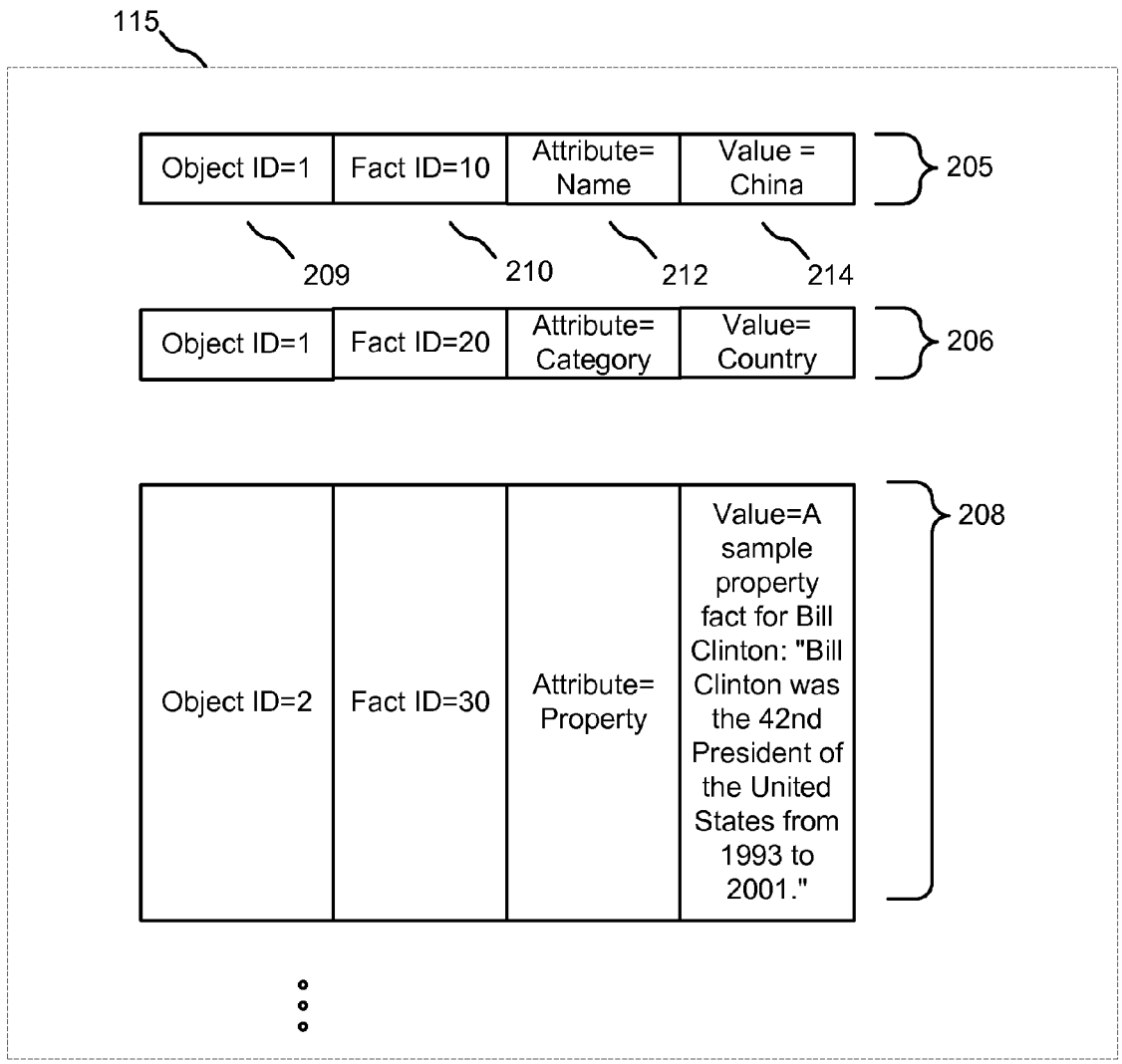

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The text string of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, text strings, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
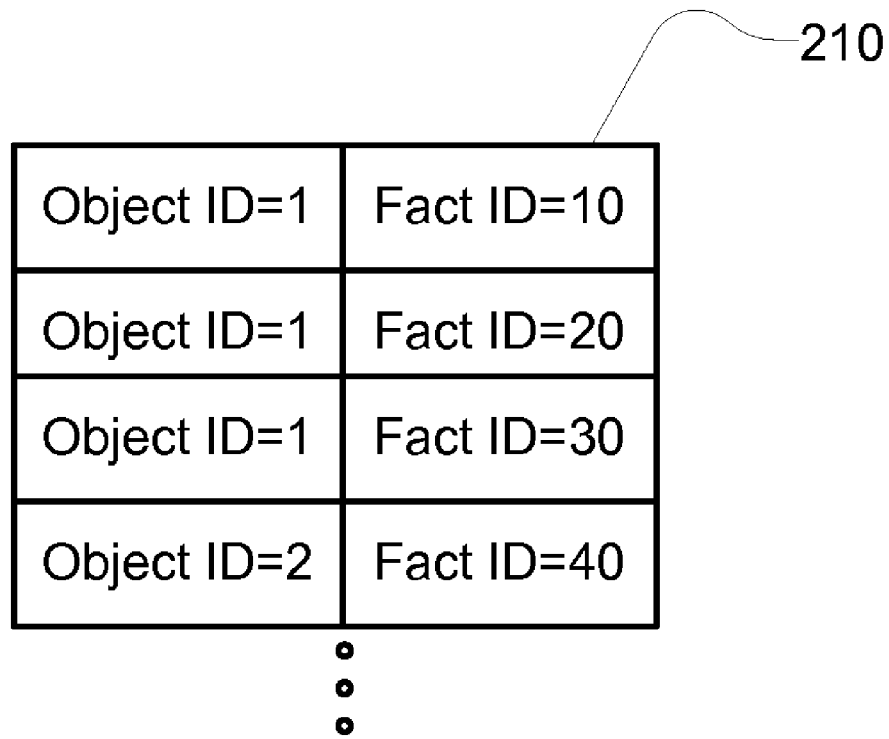

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
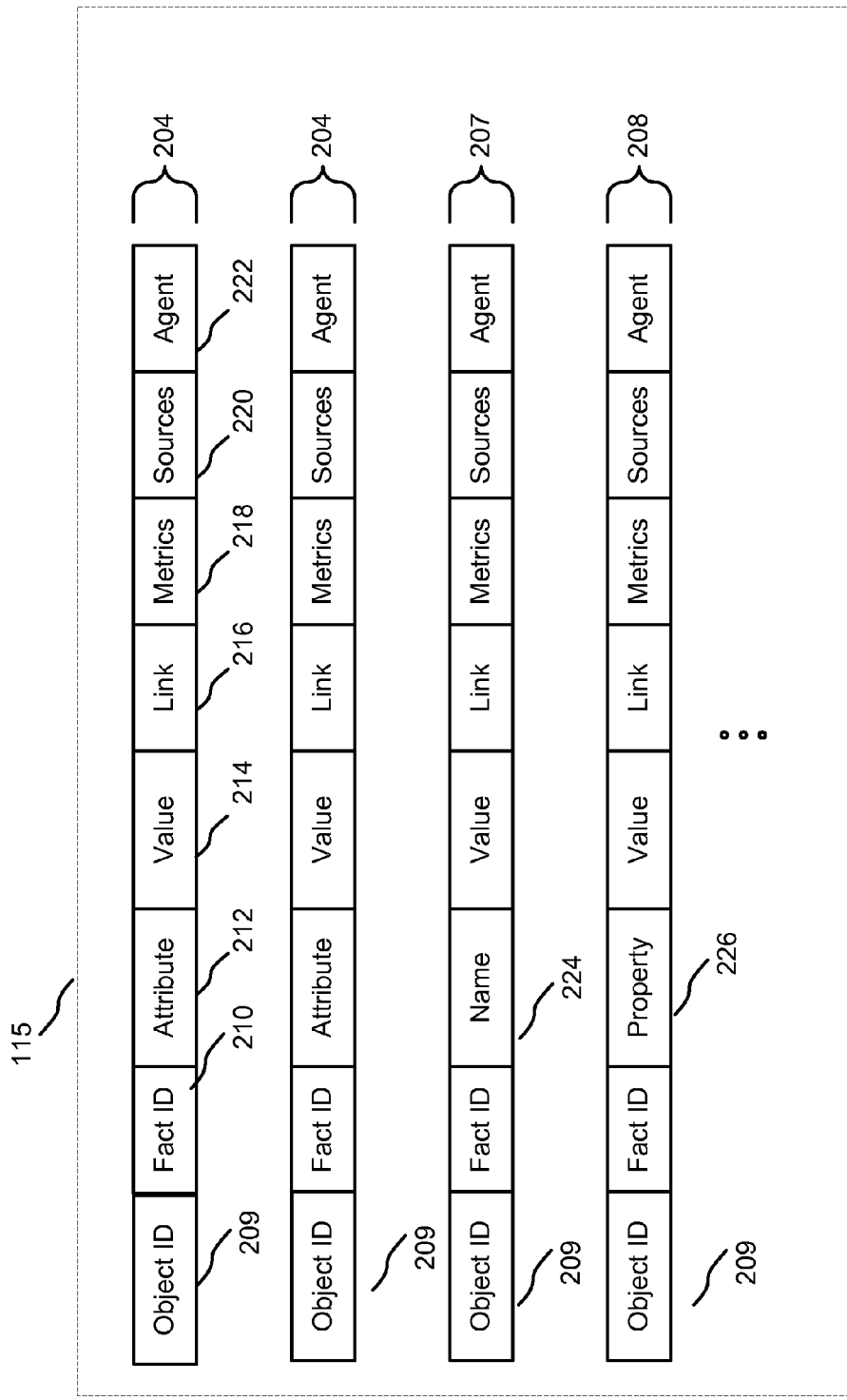

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
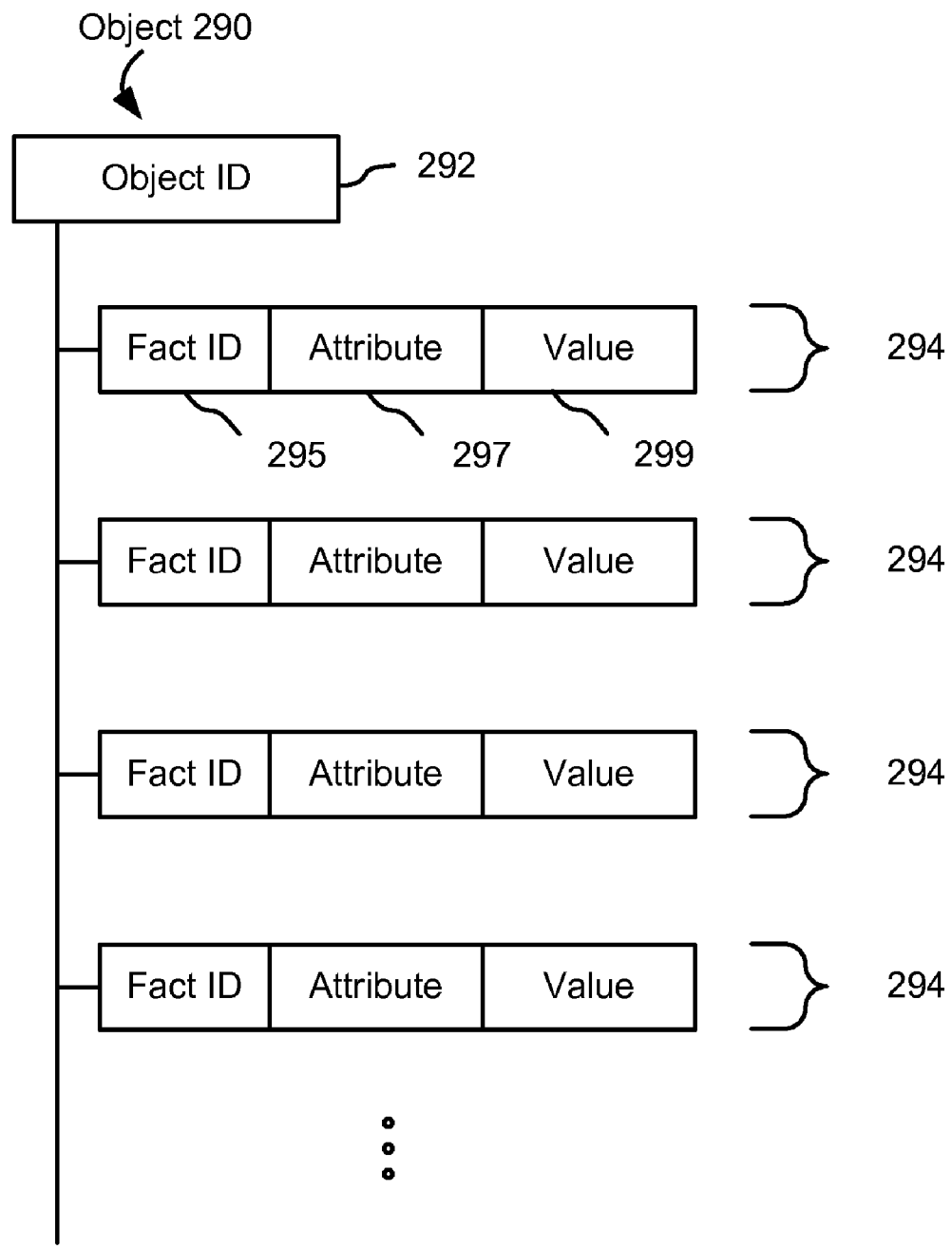
FIG. 2(e) is a block diagram illustrating an alternate data structure for facts and objects in accordance with preferred embodiments of the present invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Figure 3:
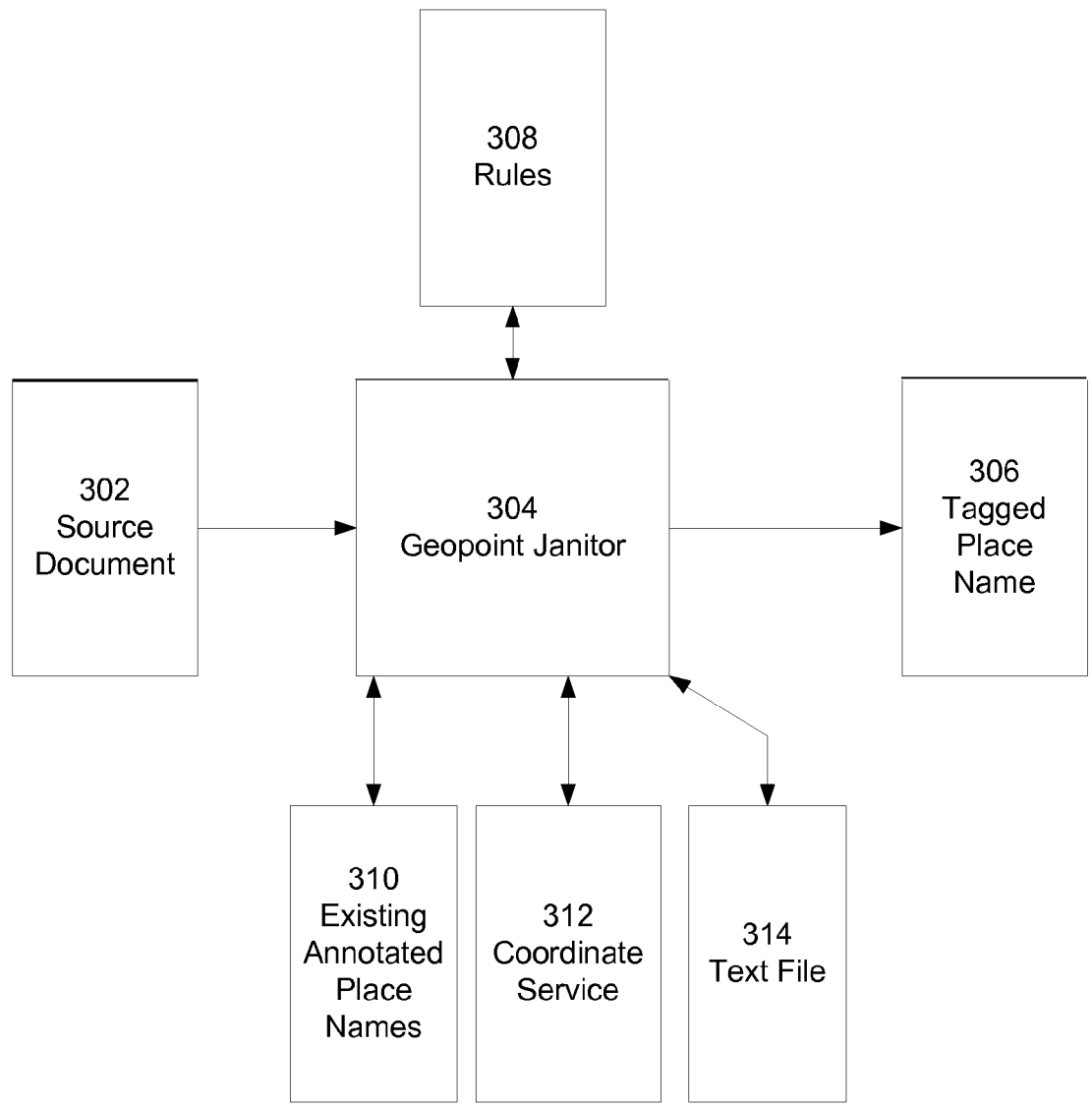
FIG. 3 is a data flow diagram illustrating a geopoint janitor, according to one embodiment of the present invention.

FIG. 3 is a data flow diagram illustrating a geopoint janitor 304, according to one embodiment of the present invention. A source document 302 may be a document, such as a website. The source document 302 may also be a fact that has been extracted previously from a document and may be stored within a computer memory. For the purposes of illustration, a single source document 302 is shown in FIG. 3. In another embodiment, a plurality of source documents 302 may be used by geopoint janitor 304.

According to one embodiment, geopoint janitor 304 determines whether at least one text string listed within source document 302 is a potential place name through the application of various rules 308, as described below with reference to FIG. 4. Geopoint janitor 304 determines whether there are known geographic location coordinates associated with the potential place name through examining a text file 314, existing annotated place names 310 and/or through a coordinate lookup service 312, according to one embodiment. If such known coordinates exist, geopoint janitor 304 tags the place name with the coordinates 306. The process of determining whether geographic location coordinates are known for the potential place name, and tagging the place name if the coordinates are known, is described below with reference to FIGS. 4-8(b).

Figure 4:
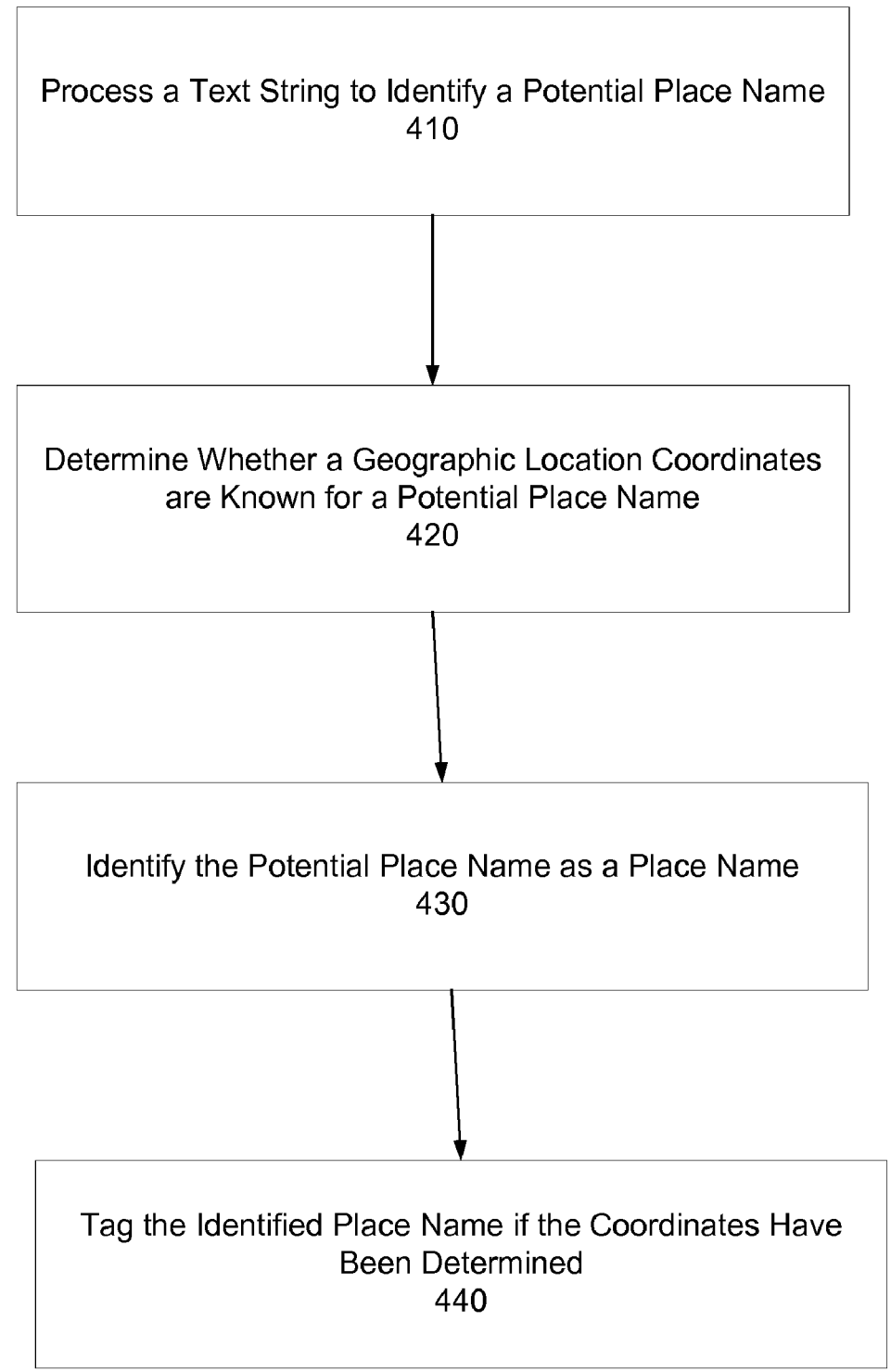
FIG. 4 is a flow chart illustrating a method for associating coordinates with potential place names, according to one embodiment of the present invention.

FIG. 4 is a flow chart illustrating a method for tagging place names with geographic location coordinates, according to one embodiment of the present invention. While the method is described with reference to FIG. 4 as being performed by a geopoint janitor 304 on information from one or more web-sites, the method is also useful in other contexts in which it is desired to identify potential place names and tag the place names with geographic location coordinates, for example, from information stored in a fact repository or other data structure or memory.

According to one embodiment, geopoint janitor 304 processes a text string to identify one or more potential place names 410. The text string may contain multiple sentences (e.g. "I love visiting Las Vegas, as long as the trip lasts no longer than 48 hours. Also, it's best if at least two years have elapsed since my last trip.") The text string may be only a single word (e.g. "Hawaii").

Geopoint janitor 304 processes a text string to identify a potential place name 410 by examining whether the text string contains sequences of one or more capitalized words. For example, in the text, "I visited the Empire State Building in New York City," geopoint janitor 304 would examine the sequences, "I", "Empire State Building" and "New York City." The capitalized words may be one or more capitalized letters, such as "NY" and "N.Y." Geopoint Janitor examines the text string to identify a potential place name in accordance with various rules 308, such as eliminating consideration of certain noise words (e.g., The, Moreover, Although, In, However, I, Mr., Ms.) or not considering the first word of a sentence. In the previous example, the first sequence, "I", would be excluded from consideration based on rules eliminating noise words and/or the first word of a sentence. As another example of a rule 308, geopoint janitor 304 may consider the words preceding and/or following a potential place name. For instance, words after the word "in" in the previous example would be examined because "in" often precedes a place name. Knowledge of what often precedes a place name can be learned through an iterative process. For example, "in" could be learned from the above example if the geopoint janitor 304 already knows that "New York City" is a place.

Figure 5:
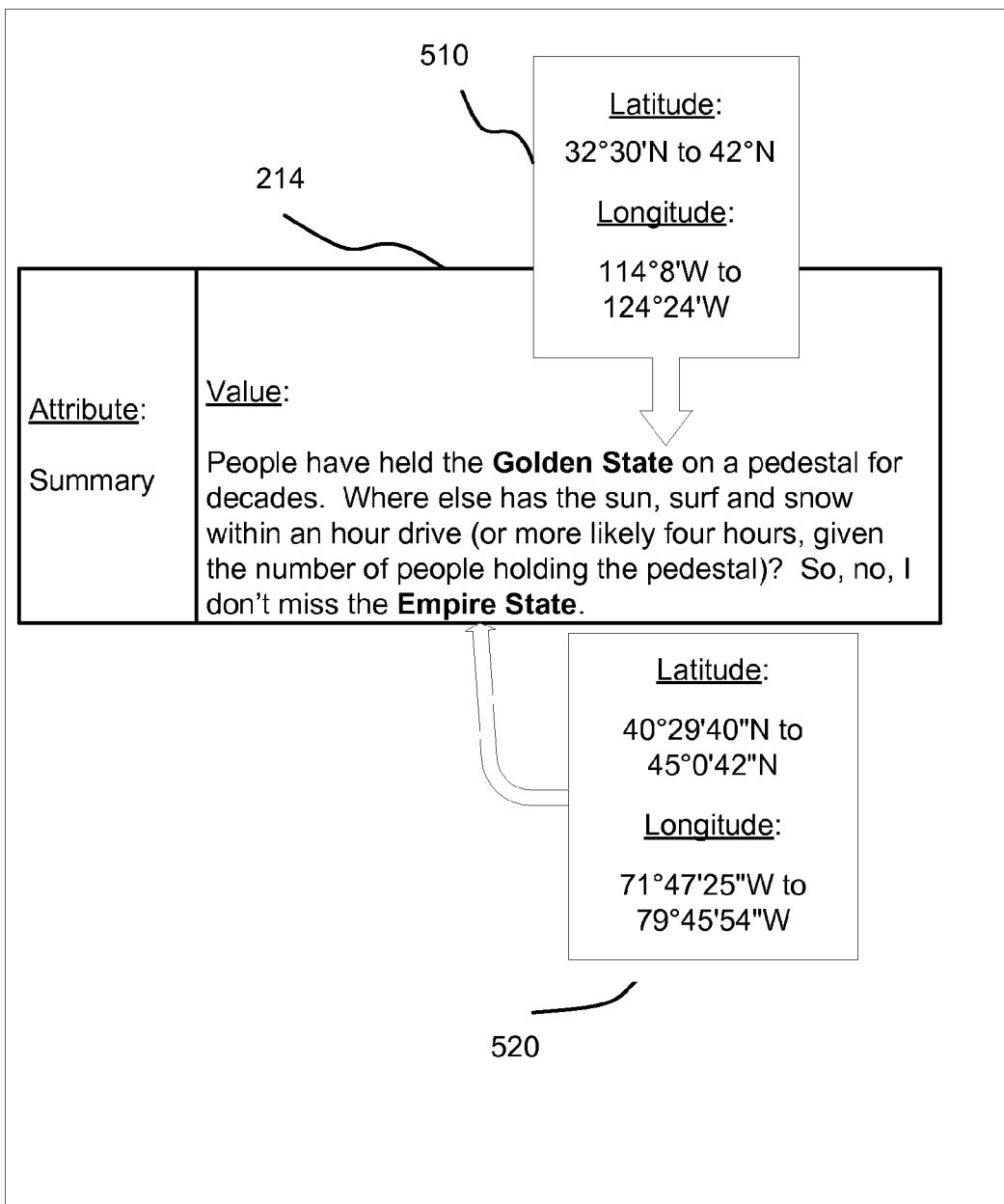
FIG. 5 is an example illustrating a method for associating coordinates with potential place names, according to one embodiment of the present invention.

FIGS. 5 and 6(a) illustrate how the geopoint janitor 304 can recognize variations of a potential place name, according to one embodiment. In FIG. 5, the text string depicted in value 214 has a variation of the state "California" as "Golden State" and the state "New York" as "Empire State." The geopoint janitor 304 can recognize various representations of the same names in variety of ways, such as by examining resources within its memory or accessing a collection of information. In one embodiment, when the variations of the same place name appear in the same text string (e.g. "I love visiting the Empire State; New York is a fabulous place to vacation."), geopoint janitor 304 can store the variations in memory for use in tagging other text strings. Examples of some of the other variations of the place names in FIG. 5 are stored in a computer memory as depicted in FIG. 6(a).

Figure 7:
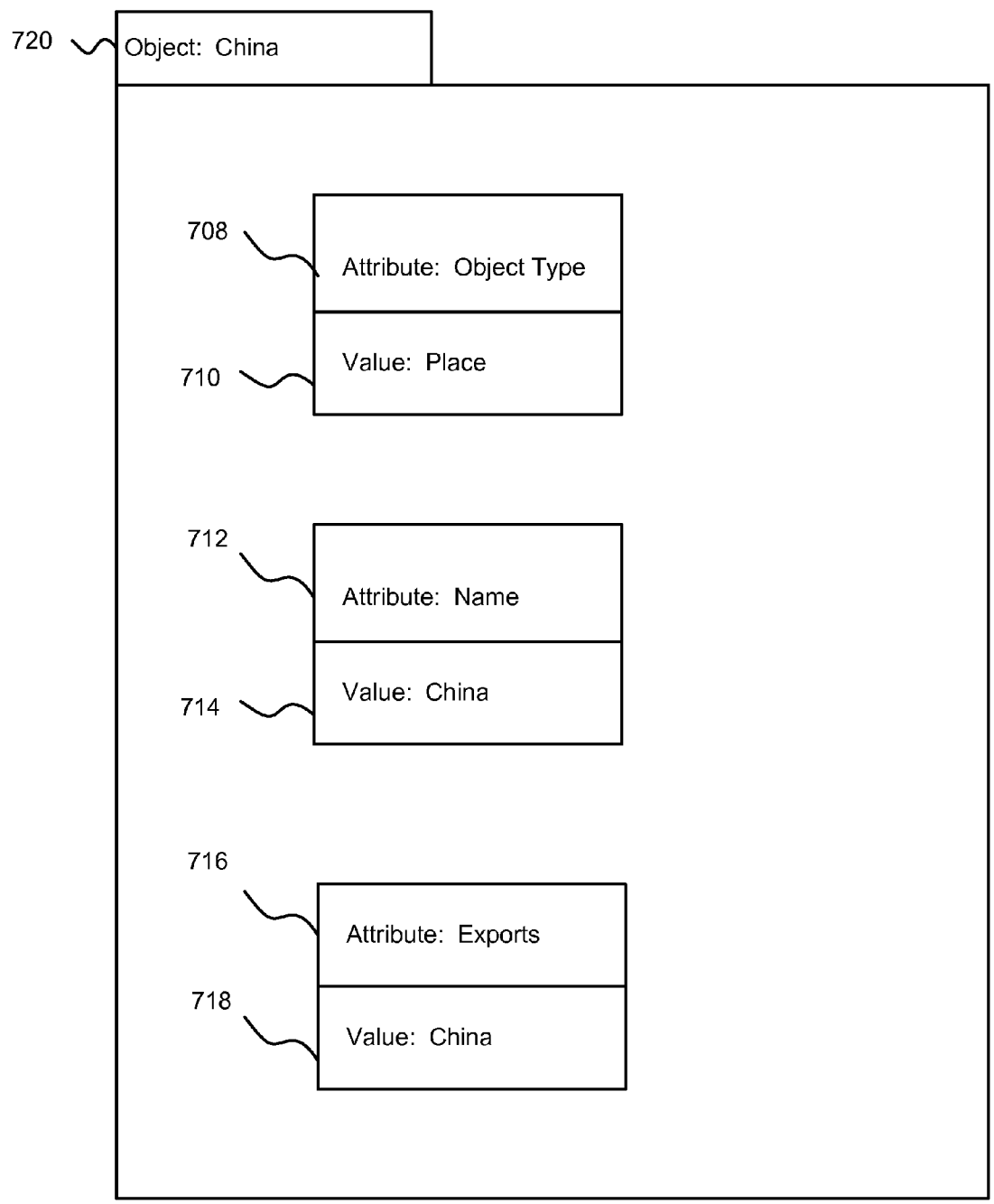
FIG. 7 is an example illustrating a method for determining whether a text string corresponds to a potential place name, according to one embodiment of the present invention.

Turning now to FIG. 7, another rule 308 that the geopoint janitor 304 may use when processing a text string to identify a potential place name 410 (FIG. 4) is through examining attribute patterns for the attribute name associated with the text string. For example, a fact having as a value a text string that included the word "Turkey" would be ambiguous until the attribute name of the fact was examined. If the attribute name were "Food", this text string would not be identified as containing a potential place name. However, if the attribute name were "Country", the "Turkey" text string would be considered to have a potential place name. For example, the attribute value "China" 714 has an attribute name of "Name." Name 712 is ambiguous and does not help determine whether this "China" represents a place name or not. However, the attribute name 716 for the "China" text string 718 is "Exports" (referring to formal china dishes). It is clear that this text string that has an "exports" attribute would not be a potential place name.

Further, geopoint janitor 304 could also examine object type in determining whether a text string contains potential place name. In FIG. 7, the attribute name 712 for the "China" text string depicted in value 714 is "Name." The geopoint janitor 304 could further examine the object type 708 associated with "Object: China" 720, where the value 710 is "Place", to determine that the "China" text string depicted in value 714 in fact contains a place name (i.e., the name of a place is probably a place name). Therefore, the text string "China" 714, would be considered a potential place name.

Moreover, a rule may be created that if the type of an object (such as "China") is a place and if the attribute name for the text string at issue (associated with that object) is a name, then the text string at issue must contain a place name. This rule may be part of rules 308 (FIG. 3) to be used by Geopoint Janitor 304 in processing text strings to identify a potential place name 410 (FIG. 4).

In addition, the geopoint janitor 304 can determine which attributes are likely associated with location values. For example, if an attribute (i.e. Favorite Place) is determined to correspond to a location value more than a specified proportion of the time, geopoint janitor 304 can create a rule that all values associated with such an attribute are locations. For instance, assume the following facts were available:

Example 1A

Country: United States
Country: Russia
Country: UK

Example 1B

Favorite Place: Argentina
Favorite Place: UK
Favorite Place The White House

In Example 1A, geopoint janitor 304 might not recognize UK as a place name at first. However, after the United States and Russia were both found to be places, geopoint janitor 304 could make the determination that a "Country" attribute is a "place" and therefore determine that the UK is a place. In Example 1B, after the determination has been made that the UK is a place, and Argentina is a place, geopoint janitor 304 could make the determination that a "Favorite Place" attribute would correspond to a "place" value, so "The White House" is also likely to be a place. Geopoint janitor 304 can then use the expanded list of place-related attributes to search for additional place names.

Figure 8A:
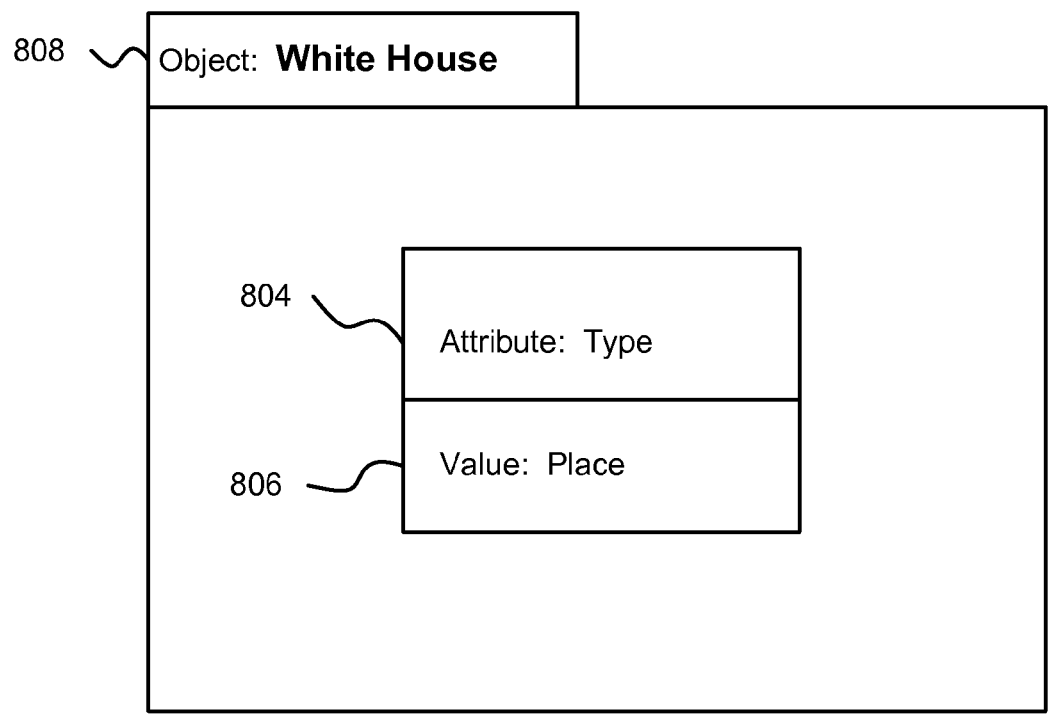
FIGS. 8(a) and 8(b) are examples illustrating a method for determining whether a text string corresponds to a potential place name, according to one embodiment of the present invention.
Figure 8B:
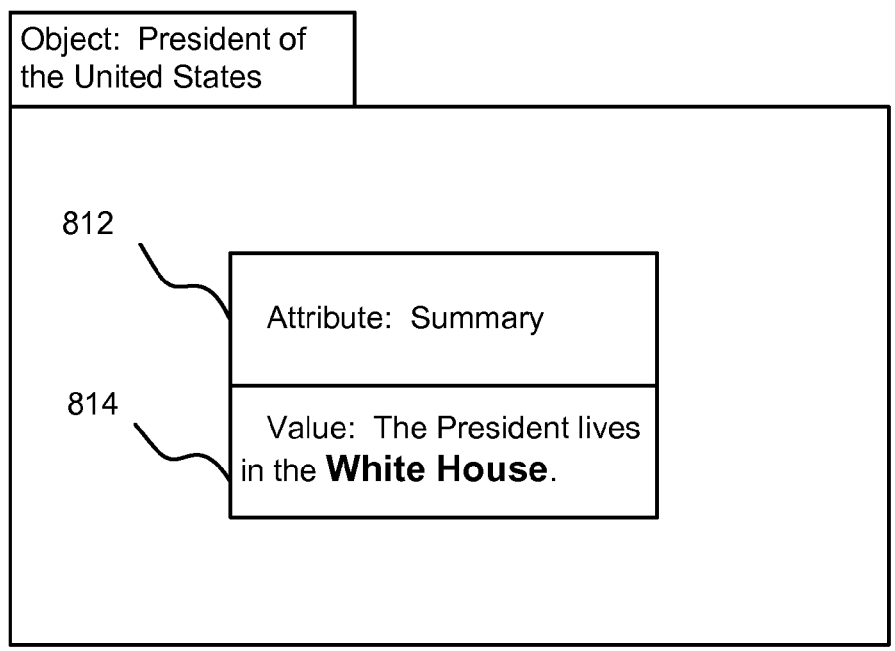

In FIGS. 8(a) and 8(b), a second object is examined to determine whether a text string contains a potential place name. In FIG. 8(b), the text string depicted in value 814 is "The President lives in the White House." Geopoint janitor 304 examines the object type 804 of "Object: White House" 808, which is "place." Because the object type 804 of the "White House" object 808 is a place, geopoint janitor 304 recognizes that the text string "The President lives in the White House" contains the identical words, and therefore "White House" is a place name.

Returning now to FIG. 4, geopoint janitor 304 determines whether geographic location coordinates are known for the potential place name 420. The geopoint janitor 304 makes this determination in variety of ways, such as by examining resources within its memory, for example existing annotated place names 310, by examining a text file 314, or by accessing a collection of information, for example a coordinate lookup service 312.

FIGS. 5 to 6(b) illustrate a method for determining whether geographic location coordinates are known for a potential place name 420, according to one embodiment of the present invention. After the text string in value 214 of FIG. 5 has been processed to identify potential place names, geopoint janitor 304 determines whether there are known geographic location coordinates associated with the potential place name through examining existing annotated place names 310, by examining a text file 314, and/or accessing a coordinate lookup service 312, according to one embodiment. For example, in FIG. 6(b), the geographic location coordinates for the California and New York place names are shown stored in a computer memory. A lookup function for "California," for example, will result in the latitude and longitude (or, here, the latitude and longitude ranges) for California. One of ordinary skill in the art will recognize there are various ways of providing and accessing a lookup service in addition to those illustrated in FIGS. 6(a) and 6(b).

Figure 9:
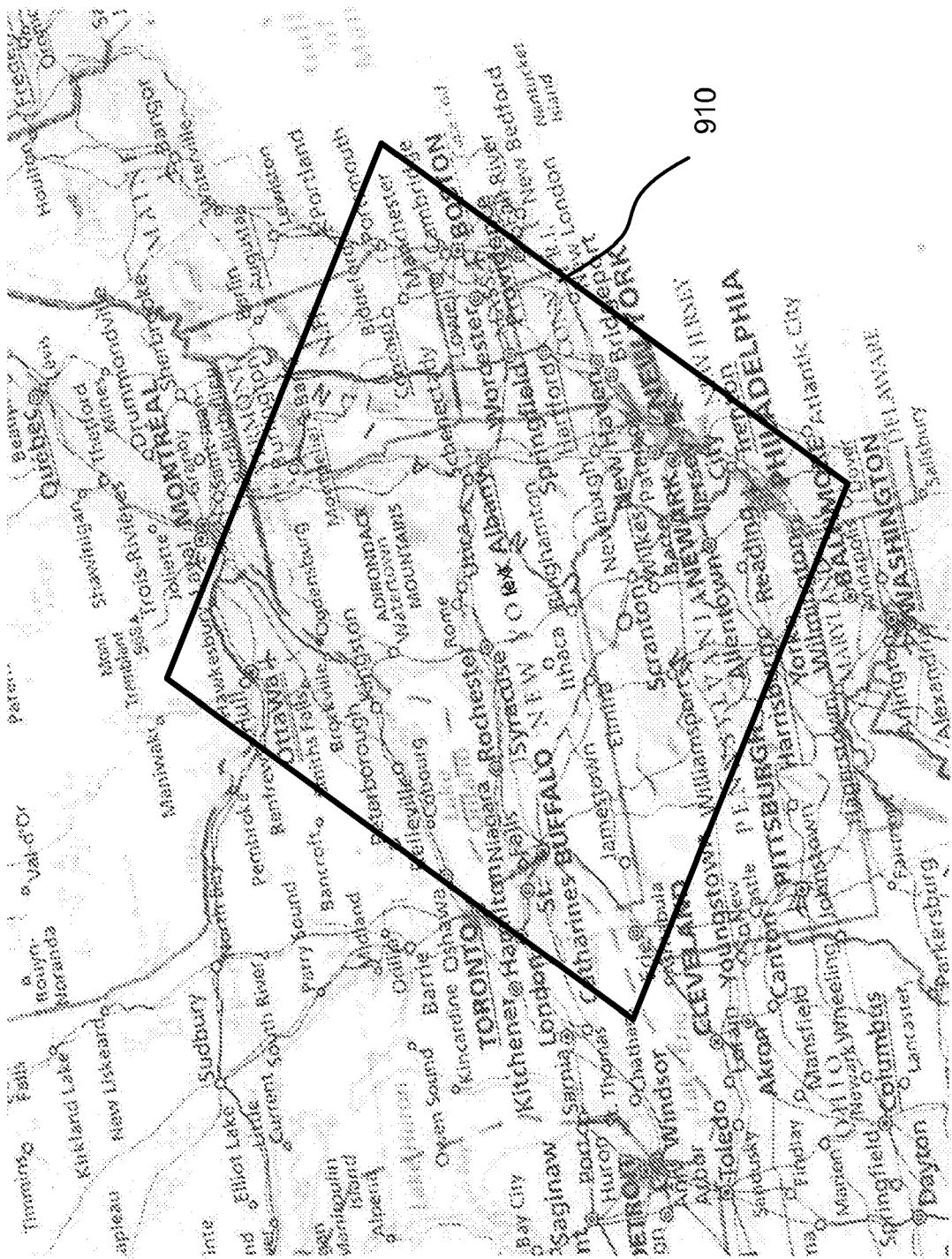
FIG. 9 is an example of a bounding box that would be assigned to a place name.

The lookup functions described above may yield various results. In one embodiment, a look up yields a place name with a latitude and a longitude. In another embodiment, the lookup results in the determination that the potential place name is in fact a place name, though it does not have location coordinates. Another lookup result is a place name with a bounding area 910 that has a latitude and longitude coordinate range, as shown for example in FIG. 9. In the example of a bounding area 910, depicted for New York State, parts of Canada, the Atlantic Ocean and other states are encapsulated within that area. Although a box shape is depicted in FIG. 9, a circle, polygon, rectangle or any other shape may be used as a bounding area. A line or point may also be used as a bounding area, or a set of unconnected circles, polygons, rectangles, lines, points, or other shapes may also define a bounding area. For example, the bounding area for the "United States" object might include a rectangle to represent the continental 48 states, a circle to represent Alaska, and a triangle to represent Hawaii.

When a lookup returns conflicting results, geopoint janitor 304 provides various disambiguation techniques for resolving the differences. In one embodiment, the lookup result that occurs most frequently is the preferred result. For example, if the lookup of a "New York" string returned one geolocation of "New York City" and another of "New York State", the preferred result would be the result that appears most frequently.

Figure 10:
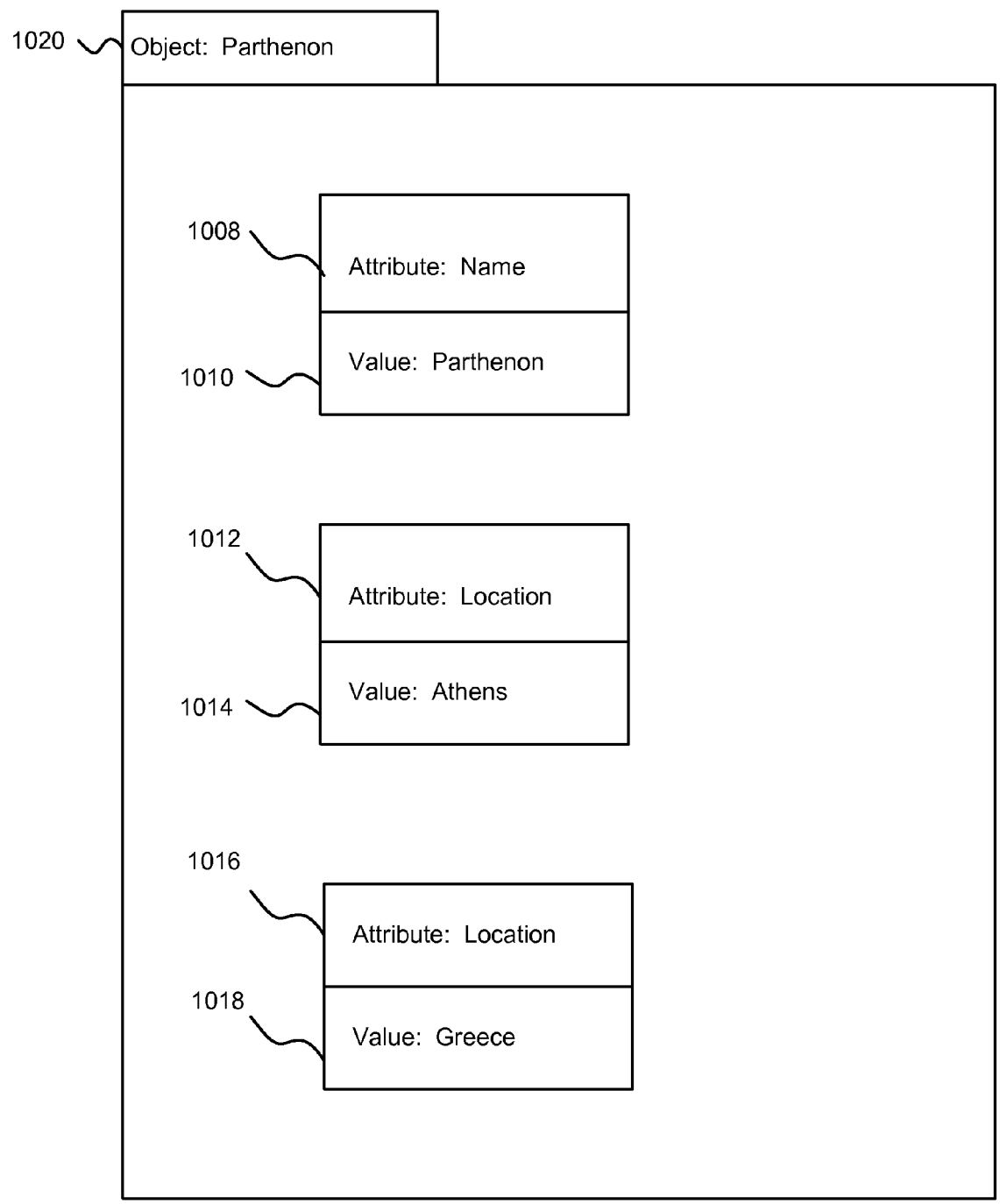
FIG. 10 is an example of input data in need of disambiguation.

In another embodiment, geopoint janitor 304 would examine the overlap of the returned results for disambiguation. FIG. 10 is an example of when different lookup results might occur and a technique for using the overlap of the results to disambiguate the returned results. In FIG. 10, the Parthenon Object 1020 has one fact with the location being Athens 1014 (from website xyz.com, for example) and another fact with the location being Greece 1018 (from website abc.com, for example). After applying the lookup to the "Athens" value 1014, geopoint janitor 304 finds that "Athens" has two sets of potential location coordinates: one potential set of location coordinates in Georgia and another potential location coordinates in Greece. After applying the lookup to the "Greece" value 1018, geopoint janitor 304 finds only one set of geographic location coordinates for the country of Greece. To resolve the ambiguity, geopoint janitor 304 can look in the same fact, according to one embodiment. For example, if the fact were "My favorite place to visit in Greece is Athens", geopoint janitor 304 could determine that Athens is in Greece based on the context of the fact. In another embodiment, geopoint janitor 304 could examine other facts on this object, such as the fact "Athens, Greece" with a location attribute. Facts with a "location" attribute could be weighted more heavily in the disambiguation determination, according to one embodiment.

The geopoint janitor 304 could also look at the context of the original source document, such as a web page from which the document was extracted. For example, if the source page describes Greek history, has Greek words on it, or is from a .gr domain, the geopoint janitor 304 would select the geopoint location coordinates in Greece rather than those in Georgia.

Figure 11:
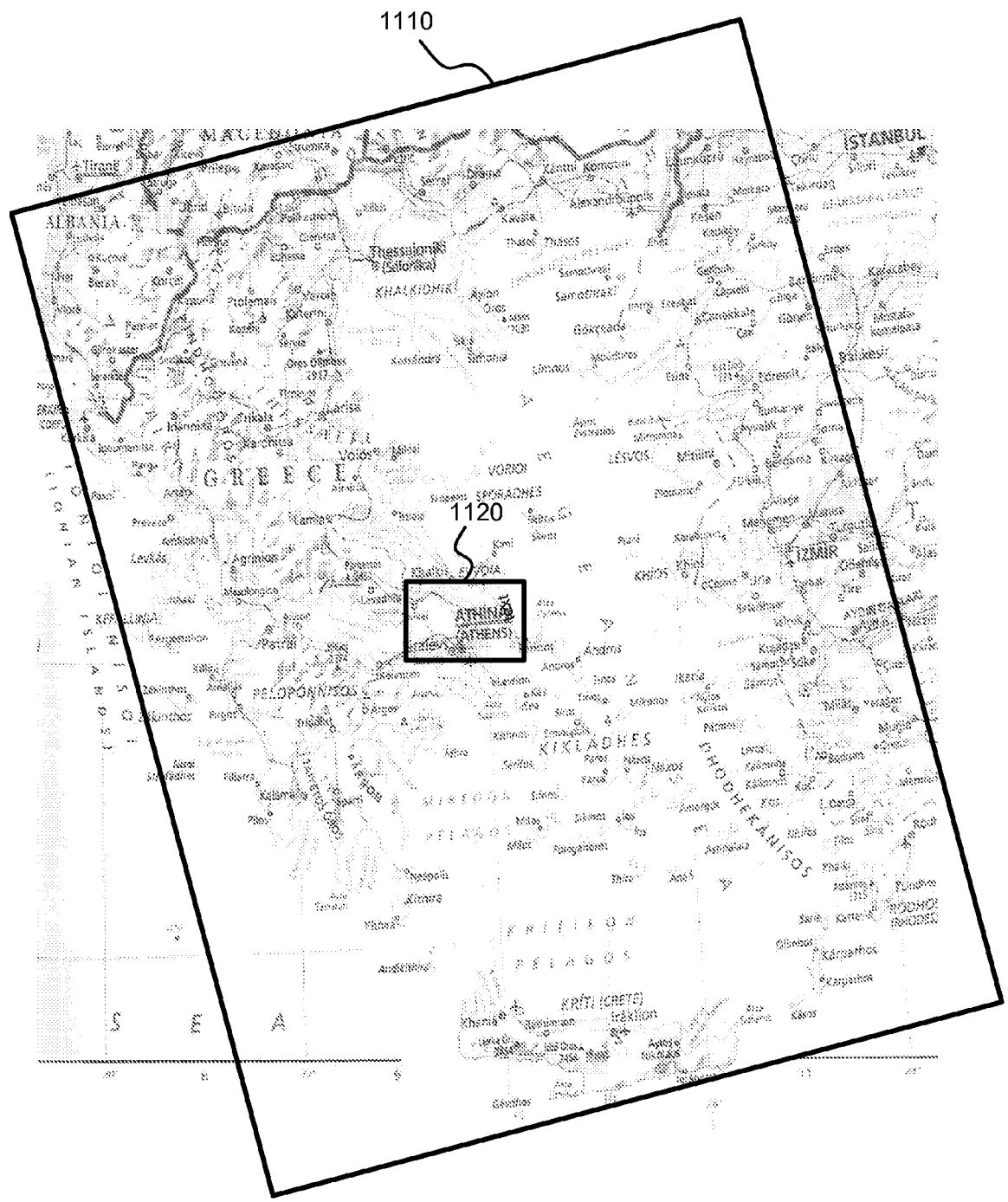
FIG. 11 is an example of a method for determining geographic location coordinates for an ambiguous potential place name.

In another embodiment, the geopoint janitor 304 determines any overlap between the potential geographic location coordinates and various location facts. As shown in FIG. 11, the boundary area for Greece 1110 overlaps with that for Athens, Greece 1120. As such, the potential location coordinates for the Athens in Georgia can be disregarded as incorrect, and the potential location coordinates for the entire country of Greece can be disregarded as too general. In another embodiment, geopoint janitor 304 would determine if the potential geolocation coordinates overlap or are a determined distance away from coordinates for another related fact in selecting the appropriate geolocation coordinates.

Returning now to FIG. 4, geopoint janitor 304 identifies 430 the first potential place name as a place name and tags 440 the place name if the geographic location coordinates have been determined 440. The tags may be located anywhere in the memory of the computer system. An illustration of tagging is shown in FIG. 5. For example, the potential place name of "Golden State" has been determined to be "California" from the table depicted in FIG. 6(*a*), as described above, and the geographic location coordinates are obtained from the table depicted in FIG. 6(*b*). The place name is then tagged, as shown in reference numeral 510, with its respective known geographic location coordinates.

Similarly, the potential place name of "Empire State" in FIG. 5 has been determined to be "New York" from the table depicted in FIG. 6(*a*), and the geographic location coordinates are obtained from the table depicted in FIG. 6(*b*). The place name is then tagged, as shown in reference numeral 520, with its respective known geographic location coordinates. One of ordinary skill in the art will recognize there are various ways of tagging place names in addition to those illustrated in FIG. 5.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, text strings, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for tagging place names with geographic location coordinates, the method comprising:
at a server system having one or more processors and memory storing programs executed by the one or more processors to perform the method:
retrieving a first fact from a fact repository, the first fact having an attribute and a value, wherein the first fact is associated with a first object, the fact repository includes a plurality of objects and a plurality of facts associated with the plurality of objects, a respective fact in the fact repository includes a respective attribute and a respective value, the respective attribute is a text string, and the attribute of the first fact and plurality of values are extracted from free text in a plurality of web documents;
determining that the attribute of the first fact indicates that the value of the first fact is a potential place name; and
in response to the determining:
identifying a first potential place name corresponding to the value of the first fact;
determining geographic location coordinates for the first potential place name, including examining frequency with which the geographic location coordinates are associated with variations of the first potential place name; and
storing the determined geographic location coordinates in the fact repository, the storing including associating the determined geographic location coordinates with the first fact.

2. The method of claim 1, wherein the identifying a first potential place name comprises examining sequences of one or more capitalized words.

3. The method of claim 1, wherein the identifying a first potential place name comprises identifying a second potential place name in the value and examining words surrounding the second potential place name.

4. The method of claim 1, wherein the identifying a first potential place name comprises identifying various representations of a same place name.

5. The method of claim 1, wherein the attribute has been determined to correspond to a place name by comparing facts containing the same attribute.

6. The method of claim 1, wherein the identifying a first potential place name comprises comparing the first potential place name with an object name associated with an identified place name in the fact repository.

7. The method of claim 1, wherein the identifying a first potential place name comprises comparing the first potential place name with an identified place name associated with a second object in the fact repository.

8. The method of claim 1, wherein the determining geographic location coordinates for the first potential place name comprises examining a plurality of place names, wherein each of the plurality of place names has been tagged previously with its respective geographic location coordinates.

9. The method of claim 1, further comprising:
identifying a second potential place name in the value;
determining geographic location coordinates for the second potential place name;
identifying the second potential place name associated with an object in the fact repository as a second place name; and
tagging the second identified place name associated with an object in memory with its geographic location coordinates.

10. The method of claim 1, wherein the identifying a first potential place name further comprises:
storing in memory a rule that if a type of the object is a place, and if an attribute for a text string associated with the object is "name", then the text string contains a place name; and
applying the rule to the first fact.

11. The method of claim 1, wherein the geographic location coordinates for the first potential place name comprise the geographic location coordinates for a bounding area surrounding the first potential place name, the bounding area having a shape selected from the group consisting of: a circle, a triangle, a rectangle, a polygon, a line, and a point.

12. The method of claim 1, wherein the determining geographic location coordinates for the first potential place name comprises:
comparing potential geographic location coordinates for the first potential place name with the geographic location coordinates for an identified place name within the same object; and
retaining the potential geographic location coordinates for the first potential place name that have overlapping bounding areas with the geographic location coordinates for the identified place name, wherein each of the overlapping bounding areas has a shape selected from the group consisting of: a circle, a triangle, a rectangle, a polygon, a line, and a point.

13. The method of claim 1, wherein the determining geographic location coordinates for the first potential place name comprises comparing potential geographic location coordinates for the first potential place name with the geographic location coordinates for an identified place name from a same source document as the source document containing the first potential place name.

14. A computer system for tagging place names with geographic location coordinates, the computer system comprising:
one or more processors;
memory;
one or more programs, wherein the one or more programs are stored in the memory and configured to be executed by the one or more processors, the one or more programs including instructions for:
retrieving a first fact from a fact repository, the first fact having an attribute and a value, wherein the first fact is associated with a first object, the fact repository includes a plurality of objects and a plurality of facts associated with the plurality of objects, a respective fact in the fact repository includes a respective attribute and a respective value, the respective attribute is a text string, and the attribute of the first fact and plurality of values are extracted from free text in a plurality of web documents;
determining that the attribute of the first fact indicates that the value of the first fact is a potential place name; and
in response to the determining:
identifying a first potential place name corresponding to the value of the first fact;
determining geographic location coordinates for the first potential place name, including examining frequency with which the geographic location coordinates are associated with variations of the first potential place name; and
storing the determined geographic location coordinates in the fact repository, the storing including associating the determined geographic location coordinates with the first fact.

15. A non-transitory computer-readable medium storing one or more programs, the one or more programs comprising instructions, which, when executed by a server system, cause the server system to perform a method comprising:
  retrieving a first fact from a fact repository, the first fact having an attribute and a value, wherein the first fact is associated with a first object, the fact repository includes a plurality of objects and a plurality of facts associated with the plurality of objects, a respective fact in the fact repository includes a respective attribute and a respective value, the respective attribute is a text string, and the attribute of the first fact and plurality of values are extracted from free text in a plurality of web documents;
  determining that the attribute of the first fact indicates that the value of the first fact is a potential place name; and
  in response to the determining:
    identifying a first potential place name corresponding to the value of the first fact;
    determining geographic location coordinates for the first potential place name, including examining frequency with which the geographic location coordinates are associated with variations of the first potential place name;
    storing the determined geographic location coordinates in the fact repository, the storing including associating the determined the geographic location coordinates with the first fact.

16. The non-transitory computer-readable medium of claim 15, wherein identifying a first potential place name comprises comparing an attribute name associated with the text string with an object name associated with an identified place name in the fact repository.

17. The non-transitory computer-readable medium of claim 15, wherein identifying a first potential place name comprises comparing the first potential place name with an identified place name associated with a second object in the fact repository.

18. A computer-implemented method for tagging place names with geographic location coordinates, the method comprising:
  at a server system having one or more processors and memory storing programs executed by the one or more processors to perform the method:
  retrieving a first fact from a fact repository, the first fact having an attribute and a value, wherein the first fact is associated with a first object, the fact repository includes a plurality of objects and a plurality of facts associated with the plurality of objects, a respective fact in the fact repository includes a respective attribute and a respective value, the respective attribute is a text string, and the attribute of the first fact and plurality of values are extracted from free text in a plurality of web documents;
  determining that the attribute of the first fact indicates that the value of the first fact is a potential place name; and
  in response to the determining:
    identifying a first potential place name corresponding to the value of the first fact;
    determining geographic location coordinates for the first potential place name, wherein the geographic location coordinates for the first potential place name comprise the geographic location coordinates for a bounding area surrounding the first potential place name, the bounding area having a shape selected from the group consisting of: a circle, a triangle, a rectangle, a polygon, a line, and a point; and
    storing the determined geographic location coordinates in the fact repository, the storing including associating the determined geographic location coordinates with the first fact.

19. A computer-implemented method for tagging place names with geographic location coordinates, the method comprising:
  at a server system having one or more processors and memory storing programs executed by the one or more processors to perform the method:
  retrieving a first fact from a fact repository, the first fact having an attribute and a value, wherein the first fact is associated with a first object, the fact repository includes a plurality of objects and a plurality of facts associated with the plurality of objects, a respective fact in the fact repository includes a respective attribute and a respective value, the respective attribute is a text string, and the attribute of the first fact and plurality of values are extracted from free text in a plurality of web documents;
  determining that the attribute of the first fact indicates that the value of the first fact is a potential place name; and
  in response to the determining:
    identifying a first potential place name corresponding to the value of the first fact;
    determining geographic location coordinates for the first potential place name, including:
      comparing potential geographic location coordinates for the first potential place name with the geographic location coordinates for an identified place name within the same object; and
      retaining the potential geographic location coordinates for the first potential place name that have overlapping bounding areas with the geographic location coordinates for the identified place name, wherein each of the overlapping bounding areas has a shape selected from the group consisting of: a circle, a triangle, a rectangle, a polygon, a line, and a point; and
    storing the determined geographic location coordinates in the fact repository, the storing including associating the determined geographic location coordinates with the first fact.

* * * * *